US011803556B1

(12) United States Patent
Samdani et al.

(10) Patent No.: US 11,803,556 B1
(45) Date of Patent: Oct. 31, 2023

(54) SYSTEM FOR HANDLING WORKPLACE QUERIES USING ONLINE LEARNING TO RANK

(71) Applicant: TOWNSEND STREET LABS, INC., San Francisco, CA (US)

(72) Inventors: Rajhans Samdani, Belmont, CA (US); Ankit Goyal, Daly City, CA (US); Pierre Rappolt, San Francisco, CA (US); Pratyus Patnaik, Los Altos, CA (US)

( * ) Notice: Subject to any disclaimer, the term of this patent is extended or adjusted under 35 U.S.C. 154(b) by 568 days.

(21) Appl. No.: 16/521,244

(22) Filed: Jul. 24, 2019

Related U.S. Application Data

(60) Provisional application No. 62/777,661, filed on Dec. 10, 2018.

(51) Int. Cl.
  *G06F 16/2457* (2019.01)
  *G06N 20/00* (2019.01)
  *G06F 21/62* (2013.01)

(52) U.S. Cl.
  CPC .... *G06F 16/24578* (2019.01); *G06F 21/6227* (2013.01); *G06N 20/00* (2019.01)

(58) Field of Classification Search
  CPC .......... G06F 16/24578; G06F 21/6227; G06N 20/00
  USPC ...................................................... 707/728
  See application file for complete search history.

(56) References Cited

U.S. PATENT DOCUMENTS 5,634,051 A    5/1997   Thomson
5,659,732 A    8/1997   Kirsch
5,966,126 A   10/1999   Szabo
6,026,388 A    2/2000   Liddy et al.
7,181,438 B1   2/2007   Szabo
7,801,896 B2   9/2010   Szabo
8,886,587 B1  11/2014   Hainsworth et al.
9,245,271 B1   1/2016   Ahmed et al.
(Continued)

FOREIGN PATENT DOCUMENTS

AU       2014286166 B2    2/2017

OTHER PUBLICATIONS

Faed, A. "Handling e-complaints in customer complaint management system using FMEA as a qualitative system," 6th International Conference on Advanced Information Management and Service, Nov. 30-Dec. 2, 2010, pp. 205-209.
(Continued)

*Primary Examiner* — Hosain T Alam
*Assistant Examiner* — Saba Ahmed
(74) *Attorney, Agent, or Firm* — Holland & Hart LLP

(57) ABSTRACT

A system creates and searches knowledge base (KB) articles inside an organization while supporting operation as a SaaS (Software as-a-Service) across a plurality of organizations. The system implements a real-time online learning-to-rank (L2R) algorithm for learning relevance scoring that is customized to each organization. This algorithm incorporates rich lexical features using a query similarity kernel. A scoring function includes a pairwise static module, which may be trained off-line using training data, and a lexical adaptive module, which is trained on-line based on user feedback. The scoring function makes the system easy to deploy, modify, and suitable for handling events that naturally happen over the lifecycle of any KB deployment, without manual training.

22 Claims, 13 Drawing Sheets

(56) References Cited

U.S. PATENT DOCUMENTS

| | | | |
|---|---|---|---|
| 9,654,640 B1 | 5/2017 | Brydon et al. | |
| 10,388,274 B1* | 8/2019 | Hoffmeister | G06N 3/0445 |
| 10,685,047 B1 | 6/2020 | Patnaik et al. | |
| 2002/0107842 A1 | 8/2002 | Biebesheimer et al. | |
| 2004/0072143 A1 | 4/2004 | Timmis et al. | |
| 2004/0243568 A1 | 12/2004 | Wang et al. | |
| 2005/0086046 A1 | 4/2005 | Bennett | |
| 2006/0160065 A1 | 7/2006 | Timmis et al. | |
| 2008/0052056 A1 | 2/2008 | Timmis et al. | |
| 2008/0077570 A1* | 3/2008 | Tang | G06F 16/951 707/999.005 |
| 2008/0235283 A1* | 9/2008 | Turnball | G11B 27/11 |
| 2009/0182609 A1 | 7/2009 | Kelleher | |
| 2010/0076998 A1 | 3/2010 | Podgorny et al. | |
| 2010/0094878 A1* | 4/2010 | Soroca | G06F 16/9577 707/812 |
| 2010/0332583 A1 | 12/2010 | Szabo | |
| 2011/0004588 A1* | 1/2011 | Leitersdorf | G06F 16/951 707/711 |
| 2011/0047163 A1* | 2/2011 | Chechik | G06F 16/70 707/E17.071 |
| 2011/0258049 A1* | 10/2011 | Ramer | G06Q 30/0273 705/14.69 |
| 2012/0078890 A1 | 3/2012 | Fan et al. | |
| 2013/0007037 A1 | 1/2013 | Azzam et al. | |
| 2013/0212096 A1 | 8/2013 | Ben Shahar | |
| 2013/0282594 A1 | 10/2013 | Gaedcke et al. | |
| 2014/0040181 A1 | 2/2014 | Kuznetsov | |
| 2014/0040246 A1* | 2/2014 | Rubinstein | G06Q 30/0256 707/722 |
| 2014/0120513 A1 | 5/2014 | Jenkins et al. | |
| 2014/0149411 A1 | 5/2014 | Anand et al. | |
| 2014/0172882 A1 | 6/2014 | Clark et al. | |
| 2015/0172294 A1 | 6/2015 | Bittner et al. | |
| 2016/0063118 A1* | 3/2016 | Campbell | G06F 16/3322 707/722 |
| 2016/0171373 A1 | 6/2016 | Allen et al. | |
| 2016/0180726 A1 | 6/2016 | Ahuja et al. | |
| 2016/0335554 A1 | 11/2016 | Koll et al. | |
| 2017/0004204 A1 | 1/2017 | Bastide et al. | |
| 2017/0228372 A1 | 8/2017 | Moreno et al. | |
| 2017/0242899 A1 | 8/2017 | Jolley et al. | |
| 2017/0243107 A1 | 8/2017 | Jolley et al. | |
| 2018/0144064 A1 | 5/2018 | Krasadakis | |
| 2018/0173698 A1 | 6/2018 | Dubey et al. | |
| 2018/0196822 A1 | 7/2018 | Lewin-Eytan et al. | |
| 2018/0212904 A1 | 7/2018 | Smullen et al. | |
| 2018/0227190 A1 | 8/2018 | Healing et al. | |
| 2018/0285423 A1 | 10/2018 | Ciano et al. | |
| 2019/0108486 A1 | 4/2019 | Jain et al. | |
| 2019/0155916 A1* | 5/2019 | Huang | G06F 16/9535 |

OTHER PUBLICATIONS

United States Office Action, U.S. Appl. No. 15/373,312, dated Dec. 10, 2019, 28 pages.
United States Office Action, U.S. Appl. No. 15/610,183, dated Jan. 3, 2020, 25 pages.
United States Office Action, U.S. Appl. No. 15/942,342, dated Feb. 10, 2020, 15 pages.
United States Office Action, U.S. Appl. No. 16/584,742, dated Nov. 12, 2021, 72 pages.
United States Office Action, U.S. Appl. No. 16/814,149, dated Feb. 22, 2022, 21 pages.
United States Office Action, U.S. Appl. No. 16/814,149, dated Sep. 29, 2021, 24 pages.

* cited by examiner

SYSTEM FOR HANDLING WORKPLACE QUERIES USING ONLINE LEARNING TO RANK

CROSS REFERENCE TO RELATED APPLICATION(S)

This application is a non-provisional of and claims priority to U.S. Provisional Patent Application No. 62/777,661 filed on Dec. 10, 2018 and entitled "System For Handling Workplace Queries Using Online Learning to Rank", which is incorporated by reference into the present disclosure.

INCORPORATION BY REFERENCE

The contents of U.S. patent application Ser. No. 15/373,312 filed on Dec. 8, 2016, titled "Request Processing System" are incorporated by reference into the present disclosure.

The contents of U.S. patent application Ser. No. 15/610,183 filed on May 31, 2017, titled "System for Determining and Modifying Deprecated Data Entries" are incorporated by reference into the present disclosure.

The contents of U.S. patent application Ser. No. 15/942,342 filed on Mar. 30, 2018, titled "Dynamic Query Routing System" are incorporated by reference into the present disclosure.

BACKGROUND

Individuals within companies or other organizations may submit requests for information or services. The requests may be processed by a variety of systems.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
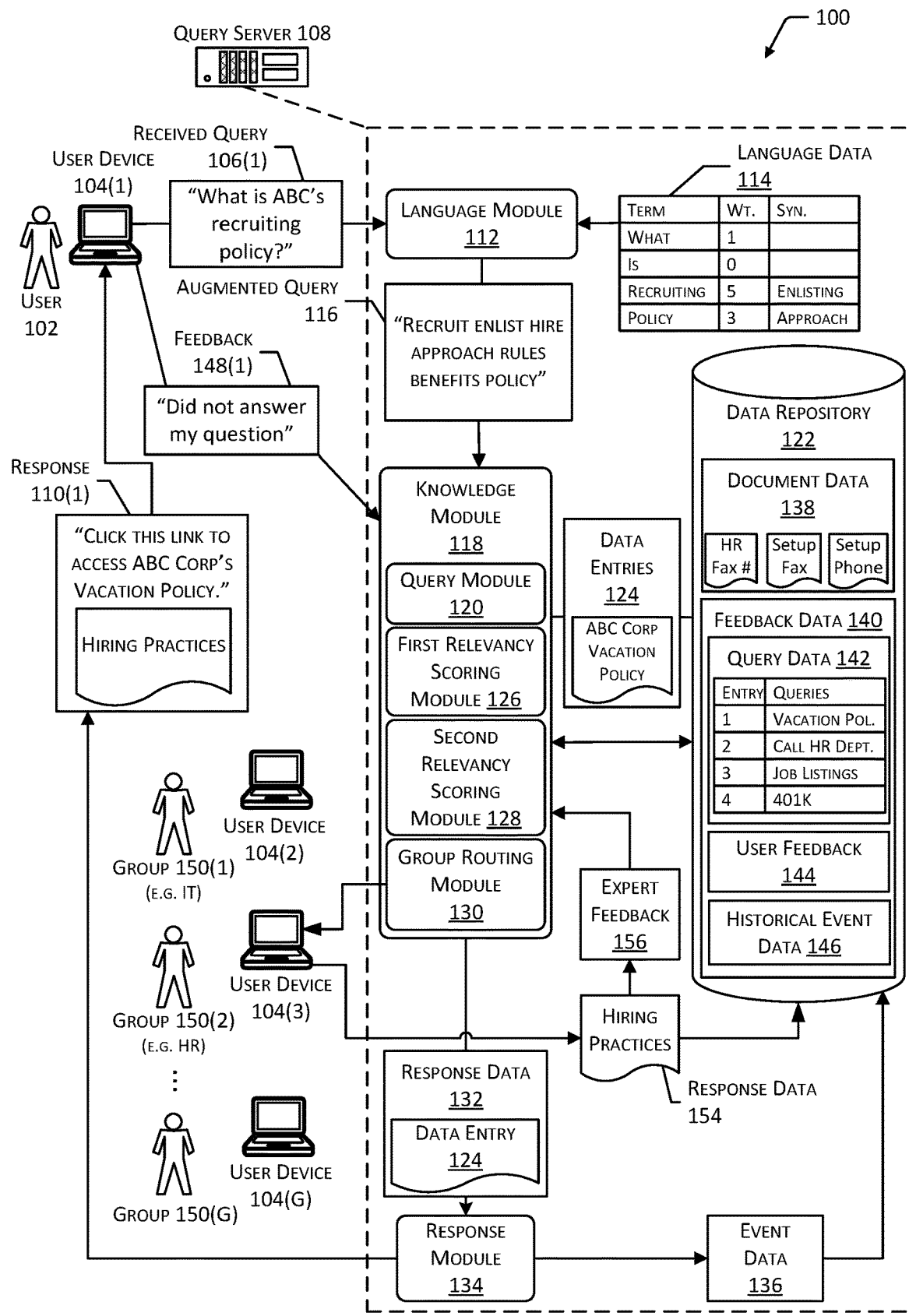
FIGS. 1A and 1B depict a system for dynamically routing queries to a particular group, according to some implementations.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Companies and other organizations may process requests for information or services from a user through various types of partially-automated systems, such as ticketing systems, or by manually processing requests. For example, an employee of a company may electronically submit a query, such as "What is the company's recruiting policy?", or "What is Mr. Smith's salary?". In some cases, the employee may transmit the query, such as through e-mail or a messaging program, to a department or a particular individual associated with the company. In other cases, the employee may transmit the query through a web portal or messaging system to an employee or group of employees responsible for routing messages to appropriate departments or individuals that may address the query. In still other cases, the employee transmitting the request may select or specify a department or individual to receive the request. Periodically, a company may review the queries that were resolved during a period of time and create articles or other sources of knowledge that may be used to answer subsequent queries of a similar nature. For example, if a company receives numerous questions within a month regarding the process for enrolling employees in a benefits program, an individual within the company may generate a web page, article, or other type of data entry that explains this process. During the next month, subsequent queries relating to enrollment in a benefits program may be resolved by directing the employee providing the subsequent query to the existing data entry.

In some cases, queries from a user may be directed toward an employee or department that is unable to resolve the query, either by the user submitting the query, other users responsible for routing the query, or an automated system. In other cases, similarities between a current query and one or more previous queries may not be readily apparent, depending on the particular language, grammar, or format of the query. In still other cases, a particular data entry may appear relevant to a received query, such as due to common keywords present in both the data entry and the query, but the data entry may not actually address the question presented by the user.

Described in this disclosure are techniques for creating and searching internal knowledge base articles. In one possible implementation, a system may include a software-as-a-service (SAAS) product, which may be deployed across a plurality of organizations with a diverse set of domains and which may include a real-time learn-to-rank algorithm that automatically customizes relevance scoring for each organization.

A user may submit a query to the system. The query may be received at the system through a messaging system, short message service (SMS), e-mail, a web portal, and so forth. The system may generate an augmented query using the received query, such as through use of natural language processing techniques. In some implementations, the system may process the received query using language data indicative of particular weights applied to certain terms of the query and synonyms of particular query terms. For example, a user query may include the text "What is ACME's recruiting policy?". The system may process the user query to determine language data, which may indicate that certain terms, such as "what" and "is" are relatively unimportant for resolving the query, and thus have a weight of zero. The language data may also indicate a relatively high weight value for the terms "recruiting", and "policy" and a moderate weight value for the terms "ACME". Additionally, the language data may indicate synonyms for one or more terms in the query. For example, the language data may indicate that synonyms for the term "recruiting" may include "recruit", "hire", and so forth. Similarly, the language data may indicate the synonyms "action", "code", "plan", "rule" and "H.R." for the term "policy". Continuing the example, the system may process the received query to generate an augmented query, such as "recruiting recruit hire policy action code plan rule".

During operation of the system, a private corpus containing articles that are available only to users from that organization may be created. In response to the received query (including the determined language data and optionally the augmented query), the system may search the private corpus of a knowledge base to identify a correct article, if such an article already exists within the knowledge base. If the article does not exist, the system may route the query to a group associated with responding to that query. The group associated with responding to that query may include one or more employees of a particular department of an organization. Continuing the above-example, if the knowledge base does not include an article that corresponds to the query, the system may determine (from words of the query) that the question relates to a human resources issue and may route the query to one or more employees of the human resources department.

In some implementations, to determine an appropriate response to the query, the augmented query may be compared with an existing set of data entries in a knowledge base, a set of previously received queries, or both. For example, in some cases, the time or computing resources needed to compare the augmented query with previously received queries within a system may be greater than the time or computing resources needed to compare the augmented query with existing data entries. In such cases, correspondence between the augmented query and the existing data entries may be determined more efficiently than correspondence between the augmented query and the numerous previous queries. For example, the system may determine how many data entries are stored in the knowledge base as compared to the number of previously received queries. If the number of data entries is less than a threshold number, it may be less computationally intensive to search the knowledge base. Alternatively, the time or computing resources associated with analysis using the data entries may exceed the time or computing resources associated with analysis using the previous queries. In such cases, correspondence between the augmented query and the previously received queries may be determined more efficiently than correspondence between the augmented query and the numerous data entries. In this example, the system may provide the search result corresponding to the previously received query in response to the received query.

In some implementations, correspondence may be determined by matching keywords found within data entries to keywords within the augmented query. The particular keywords that correspond to a particular data entry and the weight associated with each keyword may be used to determine a correspondence value (e.g., a confidence value). If the correspondence value exceeds a threshold, then the particular data entry may correspond to the augmented query. At least a subset of the existing data entries that correspond to the query may be determined. In other implementations, the determined subset of data entries may include a fixed number of data entries, such as the fifty data entries that have the greatest associated correspondence values. In still other implementations, a combination of a fixed count and a threshold value may be used. For example, fifty-five out of five hundred data entries may be determined to have a correspondence value greater than a threshold value, while the determined subset may include the twenty data entries of those fifty-five that have the greatest correspondence. As another example, the twenty data entries having the greatest correspondence values may be determined, however only sixteen out of the twenty data entries may have a correspondence value greater than a threshold value. Therefore, the determined subset may include those sixteen data entries.

After determining at least a subset of the data entries that correspond to the augmented query, the augmented query may be analyzed using the previous queries for which one or more data entries of the subset was used to resolve the previous query. For example, correspondence between the augmented query and each of the previous queries may be determined. In some implementations, each query that is received and resolved using a data entry may be recorded. Data indicative of a query that is resolved using a particular data entry may be stored in association with data indicative of the data entry. Thus, each data entry of the determined subset may have been used to resolve one or more previous queries. Correspondence between the augmented query and the previous queries associated with the subset of data entries may be used to determine a particular query having a greatest correspondence value compared to the other previous queries. For example, keywords within each of the previous queries may be compared to the keywords of the augmented query to determine a correspondence value. The correspondence value may be determined by the quantity of matched words, the weight of the words that are matched, whether a keyword from the original received query is matched, whether a synonym included in the augmented query is matched, similarities between grammatical arrangements of the received query and a previous query, and so forth. In some cases, words may not necessarily be matched, but may be synonyms of a keyword or associated with keywords. For example, keywords such as "internet" and "WiFi" may not be synonyms, but may occur in similar contexts. Continuing the example, a query that includes the term "internet" may correspond to a response that includes the term "WiFi". The particular data entry that corresponds to the previous query having the greatest correspondence (relevancy) value may be included in a response to the initial query received from a user. For example, a response to the received query may include all or a portion of the text of the data entry, a link or instructions to access the data entry, and so forth.

In some implementations, if no data entry that corresponds to the augmented query is determined, correspondence may instead be determined between the augmented query and the previous queries received for each data entry. For example, if no correspondence value is determined for any data entry that exceeds a threshold value, no subset of data entries that correspond to the augmented query may be determined. In such a case, a particular previous query may still have keywords or other parameters that correspond to the received query. If correspondence between one or more previous queries and the augmented query is determined, one or more data entries associated with the corresponding previous queries may be relevant to the received query. The data entry associated with the previous query that has the greatest correspondence value may be used to generate a response.

Queries that are resolved using one or more of the techniques described in this disclosure may be stored for future use to analyze and resolve subsequent queries. For example, a first query may be received, and a particular data entry may be used to resolve the first query. Subsequently, a second query that is identical or similar to the first query may be received. Correspondence between the second query and the first query may be determined, and the same data entry may be used to generate a response to the second query. In some implementations, feedback data associated with a response may be determined. For example, a user receiving a response may be requested to indicate whether the response appropriately resolved the received query. If the feedback data corresponds to one or more threshold feedback values, such as an indication that the response was useful, the received query may be stored for future comparison to subsequent queries. If the feedback data deviates from the threshold feedback values, such as by indicating that the response was not useful, a notification requesting human intervention to resolve the query may be generated. In some implementations, if a query is resolved by one or more human users, the resolution by the human user(s) may function as feedback data, indicating that the group to which the query was provided is a suitable destination for subsequent queries having similar parameters. In other implementations, if a query is routed from a first user or group to a second user or group, this routing may function as feedback data indicating that the second user or group is a suitable destination for subsequent queries having similar parameters. Additionally, if the query was resolved by the generation of a data entry, the received query may be stored in association with the generated data entry, such that subsequent queries having similar parameters may be resolved using the generated data entry.

In some implementations, data associated with a received query may be used to determine a source of the query. For example, a query received via SMS may be associated with a telephone number, which may be used to identify a user, device, or account, which in turn may be used to identify a company or other organization associated with the user, device or account. As another example, a query received via a web portal from a computing device within an office may be associated with a network identifier that may be used to identify the device, department, or user account associated with the query. In still another example, a user may log on to the web portal, providing username and password credentials that may be used to identify the user and associated permissions. In some cases, a user may not be authorized to access particular data entries. For example, a user may provide a query requesting restricted information, such as information relating to salaries or bonuses awarded to individuals within a company. Based on a lack of correspondence between the source of the query and security data that associates sources of queries with sources of data entries, it may be determined that the user or account associated with the query is not permitted to access the responsive data entry. In some implementations, a notification indicative of an attempt to access the data entry may be generated and provided to an administrator. In other implementations, in place of the responsive data entry, the response to the query may include an indication of an individual to be contacted for assistance resolving the query. For example, responsive to a query associated with restricted salary information, a user that is not authorized to access a data entry that includes such information may be provided with an e-mail address of an individual in a company's human resources department that may be able to resolve the query or recommend alternate sources of information.

In other implementations, data indicative of the source of a query may be used to determine a knowledgebase of data entries that may be used to respond to the query. For example, a system may store data entries from multiple sources, such as data repositories containing data entries associated with different companies. In some implementations, each data repository may store data associated with one of the companies. In other implementations, a data repository may store data associated with multiple companies, but may restrict access to the data content based on the source and access permissions of the user. In many cases, data entries associated with a first company may not include information that is useful to resolve queries from employees of a second company, independent of any similar keywords or other parameters that are common between a data entry and a query. For example, a query from an employee of a first company regarding vacation policy may not be relevant to an employee of a second company.

Additionally, many data entries may include information that is intended to be restricted to individuals associated with the particular company. For example, a company may not want information about its compensation packages to be accessible to employees of another company. As such, when a query is received, data indicative of the source of the query may be used to determine a particular device, user, account, or organization associated with the query. Correspondence between the source of the query and security data that associates sources of queries with sources of data entries may be used to determine the knowledgebase of data entries that may be used to respond to the query.

If a query is unable to be resolved automatically, the system may route the query to a group that will provide human intervention to resolve the received query. The group may comprise one or more operators that are associated with performing particular tasks for the company. Groups may provide different types of services or functions, and may be divided into canonical groups such as "information technology", "human resources", "accounting", and so forth. Each organization may have different internal labels or names for these groups.

In some implementations, correspondence may be determined between the keywords or other parameters of the received query and organization data that is specific to the company and indicative of groups, members, functions, and so forth. This correspondence may be used to determine a group that is suitable to receive and resolve the query. For example, a model specific to the company may include data that associates the terms "benefits", "human", "resources", or "HR" with an e-mail address for the human resources department of a company, while the terms "computer", "configure", "set up", or "IT" are associated with the information technology department of the company. If the keywords of the query match the particular terms associated with a group, the query may be provided to that group.

The system uses dynamic routing to assess the query and attempt to determine which group the query should be routed to. A query may be first processed using a company-specific model. The company-specific model has been trained using event data that is based on the queries, the response data associated with those queries, and which groups responded to those queries. Until a transition threshold is reached, a continuously trained system is used with ongoing real-time or near-real time machine learning techniques to associate queries with appropriate groups. As queries are responded to, event data is generated, and used to promptly retrain the continuously trained model that is associated with that company.

Embodiments of the systems and methods described herein may operate across diverse domains and with siloed datasets by extracting learning signals from user interactions. The systems and methods may be configured to learn from user feedback and expert feedback in real-time or near real-time to change its response. In some implementations, the system may include a pre-trained model, which may be trained from a training dataset that is independent of any particular organization, and may use on-line learning to further adapt the model to each organization without manual training.

The system may include a model that provides a relevance scoring function that explicitly models high-dimensional lexical features (such as raw words) to absorb semantic information from each domain. In some implementations, the relevance scoring function may be expressed in a kernelized form using query similarity functions that enable fast deployment of new features without any retraining of machine-learning models. Functions expressed in "kernelized form" may manipulate data as though it were projected into a higher dimensional space by operating on it in its original space, which leads to reduced calculation overhead, enhanced speed, and other efficiencies. In this instance, the use of the kernelized form enables adjustments and enhancements without retraining. Other advantages are also possible.

In some implementations, the system may utilize a relevance scoring function that determines the relevance of a particular article (document, web page, or other information) based on a sum of a first relevancy score and a second relevancy score. The first relevancy score may be determined from pairwise matches between the query and the text of the article. The first relevancy score may be determined using one or more textual match-based feature extractors, such as term-based similarity algorithm, semantic similarity based dot product algorithm, synonym matching algorithm, or any combination thereof. The first relevancy score may be determined by applying such textual match-based feature extractors to determine matches between terms of the query and terms of various textual fields of the articles, such as title and body. The second relevancy score may be determined from lexical features using a lexical model. Lexical features are raw words or word-based features (e.g., embeddings) that are extracted from queries in the training corpus and that are associated with documents. Such features make it possible to extract associations between words from the query and particular documents or articles. For example, a document about tax forms may include words such as "W2", "1099", and "IRS", which may be associated with the document as lexical features. Lexical features may have a large dimensionality, may be more expressive than match features, and thus may play an important role in expression semantics of the domain. The system may express the first relevancy score based on the pairwise matches as a static function that may be fixed for all articles (and across organizations) while the second relevancy score may be based on the lexical model that can be adaptively trained (continuously) from query feedback for each organization separately.

In some implementations, when the system is first brought online and the second relevancy score (lexical features score) is not yet trained, the system may use the static pairwise relevancy score to determine a document or article in response to a query. If there are no data entries for responses, the system may use a group routing model to assist in routing at least some of the queries to the appropriate groups for the generation of response data. As responses are created and event data generated, the responses may be stored in the knowledge base, and the lexical model may be trained. Further, as the system receives queries and provides documents or articles in response to the queries, the system may receive feedback, which may be used to adjust the lexical model. Other implementations are also possible.

In the event the system is unable to determine a particular group using the group routing module, the query may be provided to a default destination, such as one or more users responsible for routing queries or addressing queries of a general nature. The particular groups that receive and resolve queries may be stored as additional group data, so that subsequent queries having similar parameters may be provided to the same groups. In some cases, a response provided by a user or group of users may be stored in association with an indication of the query, such that the response may be provided responsive to subsequent queries having similar parameters.

Returning to the continuously trained system, such a system provides advantages during early use of the system by an organization. These advantages include quickly identifying documents or articles that satisfy queries, quickly learning from user feedback to provide more accurate responses and optionally to route queries to a selected group to acquire the response. The advantages may further include quickly learning which groups to route queries to, and subsequently reducing consumption of resources to re-route erroneously routed queries, reducing waste in resources due to responses from groups not associated with those queries who received the query in error, and so forth.

During operation, the system may determine characteristic data. The characteristic data comprises information that is indicative of operation of the system with respect to a particular organization, or portion thereof. For example, the characteristic data may be indicative of one or more of a count of previously received queries processed by the system for that organization, a count of previously received queries processed by the system for that organization that are associated with a particular group in that organization, a count of previously received queries that are routed using one of the company-specific models, a length of time since use of the system by the organization began, and so forth.

For example, when the system is first deployed, the system may use an initial relevancy threshold to determine when to respond to a query with an article and when to forward the query to the group. For example, in response to a query, the system may retrieve a set of articles and determine total relevancy scores for each of the articles. If the greatest total relevancy score of the set of articles is below the initial threshold value, the system may forward the query to a group to determine a response. For example, the set of articles may be ranked according to the total relevancy scores. The total relevancy score that is greater than all of the other total relevancy scores can be determined to be the "greatest total relevancy score." However, if the greatest total relevancy score is equal to or greater than the initial threshold, the system may provide the article to the user in response to the query. The user may then review the article and provide feedback, which may help to train the system.

By using the techniques described in this disclosure, the system is able to quickly begin responding to queries with appropriate articles from a knowledge base and to begin routing requests to appropriate groups when an article is not available. The initial system using the group routing model helps direct at least some of the incoming queries to appropriate groups of the organization during the early stages of usage. As event data is subsequently generated and feedback is incorporated, the system may provide increasingly accurate responses to queries. As a result, the system is able to seamlessly provide service to users while minimizing resource usage and continuing to improve the accuracy of the responses.

Illustrative System

Figure 1B:
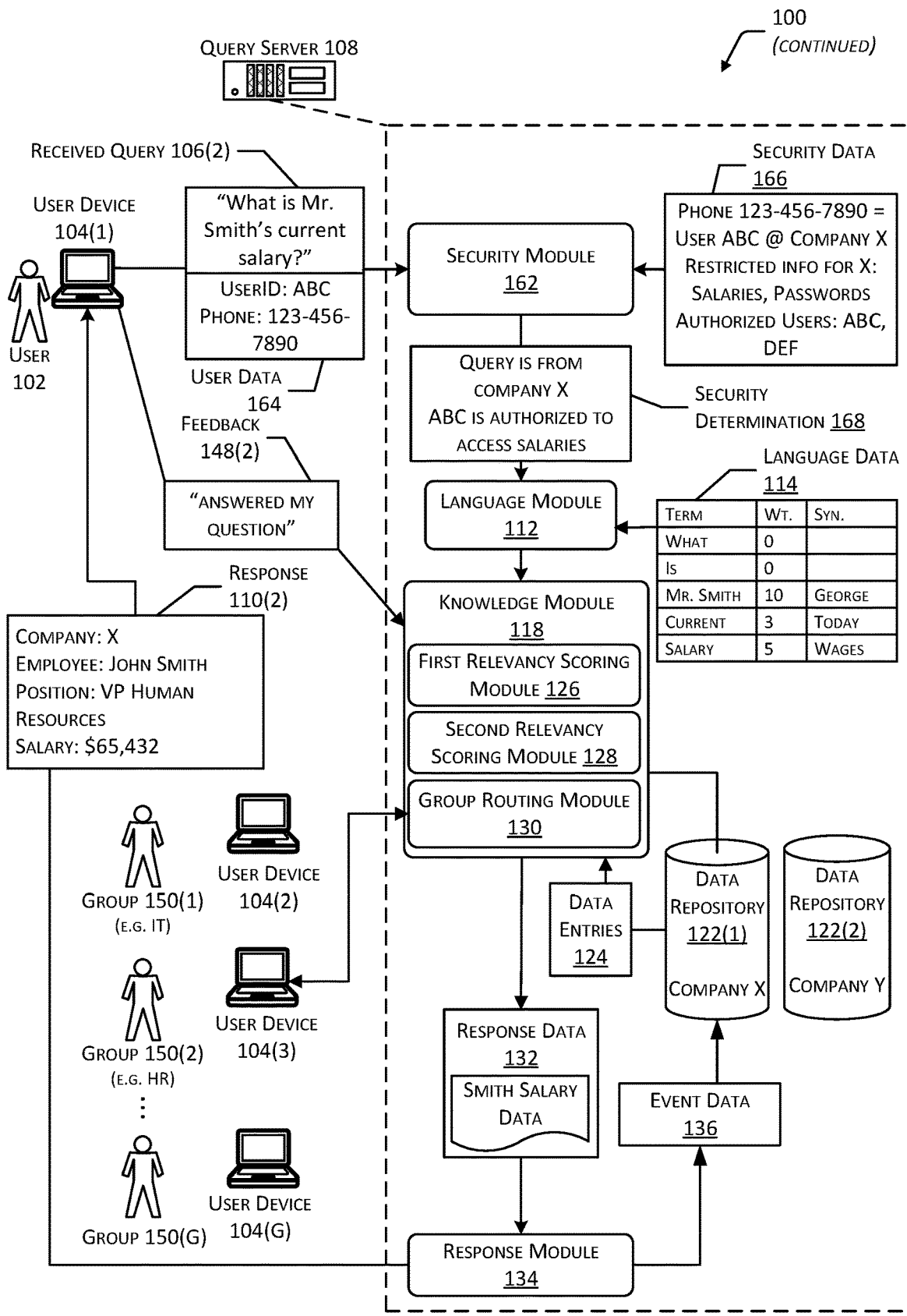

FIGS. 1A and 1B depict a system 100 for dynamically routing and processing a received query 106 to generate a response 110, according to some implementations. The received query 106 may include, for example, a request for information, one or more services, and so forth. For example, a user 102 within a company or other organization may access a user device 104 to generate a received query 106, which may be provided from the user device 104 to a query server 108 for processing. The user device 104 may include any type of computing device including, without limitation, a smartphone, tablet computer, wearable computer, or other type of mobile or portable device, a desktop computer, laptop computer, or other type of personal computer, an automotive computer, a set-top box, a server, a game controller, and so forth. While FIG. 1 depicts a single user device 104 providing the received query 106 directly to the query server 108, in other implementations, the user device 104 may include multiple computing devices, or the user device 104 may provide the received query 106 to one or more intermediate computing devices, access points, and so forth, which in turn provide the received query 106 to the query server 108. Additionally, while FIG. 1 depicts a single query server 108 receiving the received query 106, the query server 108 may include any number and any type of computing devices including, without limitation, the types of computing devices described with respect to the user device 104. The received query 106 may include any manner of data including, without limitation, alphanumeric data, audio data, image data, and so forth. For example, FIG. 1 depicts the received query 106 including the text "What is ABC's recruiting policy?", which may be input using a keyboard, touch sensor, or other input device associated with the user device 104. In other implementations, the received query 106 may be input using a microphone in conjunction with speech-to-text software or a camera or other image sensor in conjunction with optical character recognition software.

The received query 106 may include various parameters, such as keywords having a particular arrangement, such as a grammatical structure or format. For example, the received query 106 may include a question or statement expressed in natural language. The parameters of the received query 106 may include the particular words used in the query, the arrangement of the words, the formatting of one or more words, additional characters such as punctuation, and so forth. For example, a terminal question mark may indicate that the received query 106 includes a question, the presence of intermediate periods or a word containing all capital letters may indicate that one or more terms within the received query 106 include an abbreviation or acronym, or the presence of a capitalized word within the received query 106 may indicate that the particular word is a proper noun.

A language module 112 associated with the query server 108 may process the received query 106 using language data 114, to generate an augmented query 116. The language data 114 may associate various keywords or other parameters of queries with weight values. For example, words that are unlikely to indicate the nature of a received query 106, or words that are likely to be common to a large number of unrelated queries, such as "I", "my", "to", and "a" may be assigned a low weight value, or a weight value of zero. Continuing the example, words having a weight value of zero may be disregarded or omitted from the augmented query 116. Conversely, words that are likely to indicate the nature of the received query 106 or words that are less likely to be included in a large number of other queries may be assigned a high weight value. Similarly, words that are moderately likely to indicate the nature of the received query 106 may be assigned a moderate weight value.

As an illustrative example, FIG. 1 depicts the language data 114 assigning a weight value of "1" to the query term "What", a weight value of "0" to the query term "is", a weight value of "5" to the query term "recruiting", and a weight value of "3" to the query term "policy". Continuing the example, in the received query 106 "What is ABC's recruiting policy?", the term "is" does not identify the nature of the received query 106 and would be likely to occur in a large number of other unrelated queries, and is thus assigned a weight value of zero. The term "What" indicates that the received query 106 relates to a request for information, but does not indicate the nature of the received query 106 and is likely to occur in other unrelated queries, and is thus assigned a weight value of one. The term "policy" is moderately indicative of the nature of the received query 106 and moderately likely to occur in other queries, and is thus assigned a weight value of three. The term "recruiting" is highly indicative of the nature of the received query 106 and is only likely to occur in other queries relating to hiring policies, and is thus assigned a weight value of five. Other terms of the received query 106 may similarly be included in the language data 114 and associated with a weight value. Words in the received query 106 that are not included in the language data 114 may be assigned a default weight value. In some implementations, the arrangement, punctuation, formatting, and so forth of particular words within the received query 106 may also be assigned a weight value.

The language data 114 may also indicate one or more synonyms associated with particular keywords within the received query 106. For example, the language data 114 may indicate the terms "Enlist", "Hire", and "Approach" may be synonyms for the root term "Recruit", the terms "Rules" and "Benefits" may be synonyms for the term "Policy", and so forth. When determining a response 110 that corresponds to the received query 106, the determined synonyms may also be used to locate corresponding materials for inclusion in the response 110. In some implementations, a single synonym may be associated with multiple words within the received query 106. Similarly, multiple synonyms may correspond to a single term of the query, such as the synonyms "Hire" and "Enlist" for the root query term "Recruit".

The augmented query 116 may be generated by removing one or more terms from the received query 106 that have a weight value less than a threshold value. For example, the terms "What", "Is", and so forth may have a weight value of zero, or a weight value less than a threshold value, such as three. The augmented query 116 may also include one or more of the synonyms determined to correspond to the terms of the received query 106. For example, in addition to the initial terms of the received query 106, the augmented query 116 may include the synonyms "Enlist", "Hire", "Approach", "Rules", and "Benefits". As a result, the initial received query 106 of "What is ABC's recruiting policy?" may be used to generate the augmented query 116 of "Recruit Enlist Hire Approach Rules Benefits Policy". The term "ABC's" may be understood by the language module 112 to specify a particular organization. The term "ABC's" may be omitted from the augmented query 116 when the query server 108 searches siloed data sources. If the query server 108 searches multiple intermingled data sources, the term "ABC's" may be included together with variations of the company name. In some implementations, the augmented query 116 may include additional data indicative of the weight values of each term included therein. In other implementations, the augmented query 116 may also include data indicative of other parameters of the received query 106, such as arrangements of words, capitalization, formatting, punctuation, and so forth.

A knowledge module 118 associated with the query server 108 may access a data repository 122 or other source of data entries 124 to determine one or more data entries 124 that correspond to the augmented query 116. A data entry 124 may include alphanumeric data, audio data, image data, or one or more other types of data that may be used to convey information to a user. For example, a data entry 124 may include a document, spreadsheet, database, web page, audio file, video file, one or more images, and so forth. Each data entry 124 within the data repository 122 may include various terms or other parameters. For example, a first data entry 124 may include information for contacting the human resources department of a company via a fax transmission, a second data entry 124 may include information for setting up an office telephone, while a third data entry 124 may include information for setting up an office computer to send and receive fax transmissions. The knowledge module 118 may determine correspondence between the parameters of the augmented query 116 and the parameters of the document data 138 within the data repository 122 to identify a subset of data entries 124 that correspond to the augmented query 116 and may potentially be used to generate a response 110. For example, the knowledge module 118 may determine that one or more particular data entries 124 within the document data 138 share a threshold number of common keywords with the augmented query 116. As another example, the augmented query 116 may include the indication of a weight value for one or more keywords, and the knowledge module 118 may determine a subset of data entries 124 having common keywords with the augmented query 116 that are associated with an aggregate weight value that exceeds a threshold weight value. Continuing the example, a first data entry 124 with the terms "Vacation" and "Policy" may share the common term "Policy" with the augmented query 116. A second data entry 124 with the terms "Reimbursement" and "Policy" may also share the common term "Policy" with the augmented query 116, which may have a weight value of three. A third data entry 124 with the terms "New Hire" and "Vacation" and "Policy" may share the terms "Hire" and "Policy" with the augmented query 116, and the aggregate weight value of these terms may be eight. If the threshold weight value is five, the knowledge module 118 may determine that the third data entry 124 has an aggregate weight value equal to or exceeding the threshold weight value. In some implementations, one or more data entries 124 may be accompanied by metadata indicating synonyms or associated parameters that correspond to the data entries 124. For example, a particular data entry 124 may not contain specific keywords found in a query, however, the metadata associated with that data entry 124 may indicate that those specific keywords are related to the data entry 124. Therefore, the data entry 124 may correspond to the augmented query 116 even if the data entry 124 does not contain the particular keywords found in the query.

The knowledge module 118 may include a query module 120 configured to process the augmented query 116 to search a data repository 122 to determine a particular responsive data entry 124 that may be used to generate the response 110 to the received query 106. The query module 120 may access query data 142, which may include data indicative of previous queries received by the query server 108. The query data 142 may indicate each data entry 124 determined by the knowledge module 118 and one or more previous queries (in the query data 142) for which a respective data entry 124 was determined to be responsive. As one illustrative example, FIG. 1 depicts the previous queries "Vacation Policies", "Call HR Department", "Job Listings", and "401K" associated with the data entry "Policy", and one or more other previous queries associated with the data entry "Policy". The query module 120 may determine correspondence between the previous queries for each data entry 124 determined by the knowledge module 118 and one or more of the augmented query 116 or the received query 106. For example, the query module 120 may determine common terms shared by one or more previous queries and the augmented query 116. In some implementations, the query module 120 may determine an aggregate weight value for the terms shared by each previous query and the augmented query 116 or received query 106. In one specific implementation, based on correspondence between the query data 142 and the augmented query 116 or received query 106, the query module 120 may determine a particular previous query that is more similar to the augmented query 116 or received query 106 than other precious queries associated with the data entries 124. The responsive data entry 124 may be the particular data entry 124 that is associated with the particular previous query most similar to the augmented query 116 or received query 106. In other implementations, the query module 120 may determine correspondence values associated with at least a portion of the previous queries that are associated with the data entries 124 determined by the knowledge module 118. The particular responsive data entry 124 may be determined based on a combination of the correspondence value for that data entry 124 determined by the knowledge module 118 and the correspondence values for the associated previous queries determined by the query module 120.

In some implementations, the query module 120 may search the data repository 122 based on the augmented query 116 to retrieve one or more documents related to the augmented query 116. The knowledge module 118 may include a first relevancy scoring module 126 and a second relevancy scoring module 128 that can be used to determine total relevancy scores for one or more of the documents retrieved by the query module 120, regardless of how the documents are retrieved (based on a search or based on correspondence to previous queries). For example, the first relevancy scoring module may implement a pairwise static similarity algorithm. In another example, the second relevancy scoring module may use a lexical adaptive model.

The first relevancy scoring module 126 may include one or more algorithms including one or more coefficients, which may have been trained using pre-labeled training examples. For example, pre-labeled training examples may include a set of documents (training data) including added labels including meaningful data (semantic content), which may be used by machine learning to train the first relevancy scoring module 126. The first relevancy scoring module 126 may determine matches between terms of the augmented query 116 and terms of data entries 124 within the document data 138 of the data repository 122. In some implementations, the first relevancy scoring module 126 may use one or more textual match-based feature extractors (term-based similarity algorithm, semantic similarity based dot product algorithm, a synonym match algorithm, another matching algorithm, or any combination thereof). For example, one possible term-based similarity algorithm may include the Okapi BM25 algorithm, which is based on a probabilistic retrieval framework developed by Stephen E. Robertson, Karen Sparck Jones, and others and which was implemented in the Okapi Information Retrieval System at London's City University. The abbreviation "BM" stands for "Best Match". The BM25 algorithm and its newer variants (such as BM25F) represent Term-Frequency—Inverse Document Frequency algorithms, which may take into account document structure, anchor text, and other document attributes. In another example, one possible implementation of the semantic similarity-based dot product algorithm includes the Word2Vec algorithm or similar algorithms. The Word2Vec algorithm was created by a team of researchers led by Tomas Mikolov at Google, Inc. The Word2Vec type of algorithm represents a group of related models that can be used to produce word embeddings. The models are two-layer neural networks trained to reconstruct linguistic contexts of words by taking an input of a corpus of text and producing a vector space output of multiple dimensions. The first relevancy scoring module 126 may determine a first relevancy score for a data entry 124 or for each of a set of data entries 124. For example, the first relevancy score may be a value between 0 and 1 that is indicative of a correspondence between the augmented query terms and terms of the data entry 124.

The second relevancy scoring module 128 may include one or more algorithms including one or more coefficients, which may be modified based on feedback. The second relevancy scoring module 128 may determine a second relevancy score based on query terms (of the received query 106(1) or of the augmented query 116) to determine correspondence with raw words or word-based features (embeddings) that were extracted from queries (q) in the training corpus and that are associated with data entries (d) within the document data 138. For example, a document about Tax Forms may include words such as "W2", "1099", "IRS", "Gross Income", and so on, which words may be associated with the document as lexical features. The lexical features may correspond to semantic content. Lexical features may include root words, parts of compound words (even prefixes and suffixes), and even compound words and phrases. Lexical features can include information about categories (lexical and syntactic), form, and meaning. Lexical features can be categorized into a larger context or domain, which may be used to determine semantic content. The semantic content may include a precise meaning of a lexical feature or may include an association to one or more related terms. Lexical features may have a relatively large dimensionality since they include raw word information.

The knowledge module 118 may model the total relevancy score for one or more of the documents (d) or search results as a sum of a first relevancy score (pair-wise match-based score by the first relevancy scoring module 126) and a second relevancy score (adaptive lexical score by the second relevancy scoring module 128). The total relevancy score may be expressed according to the following equation:

$$s(q,d) = f^1(\omega_{pairwise}(q,d); \theta_1) + f^2(\psi_{lexical}(q,d)\theta_2^d) = s_{static}(q,d) + s_{adapt}(q,d), \quad \text{(Equation 1)}$$

where the first function ($f^1$) represents the first relevancy scoring algorithm or function, and the second function ($f^2$) represents the adaptive lexical function. In Equation 1, the variable q represents the query, the variable d represents the data entry or document, the function $\psi$ may represent the relevance scoring function, and $\theta$ represents a set of parameters across a set of documents. In this example, the function $s_{static}$ represents the first relevancy scoring function (pair-wise static function) $f^1$, and the function $s_{adapt}$ represents the second relevancy scoring function (adaptive lexical function) $f^2$. In the absence of user feedback, the knowledge module 118 may utilize the first function (first relevancy scoring module 126), which may be trained offline using the labeled training data, to determine first relevancy scores for a set of search results. After feedback has been received (from users 102 or from experts, such as members of a group 150), the knowledge module 118 may utilize first relevancy scores from the first relevancy scoring module 126 and second relevancy scores from the second relevancy scoring module 128, which may be trained on-line based on the feedback. In some examples, the second relevancy scoring module 128 may include one or more algorithms including coefficients. The coefficients of the second relevancy scoring module 128 may be adjusted (modified), such as by changing a first value of the coefficients to a second value, replacing a first value with a second value, adding an adjustment value to a first value to produce a second value, and so on. The first relevancy score for a first search result may be added to a second relevancy score for the first search result to produce a total relevancy score for the first search result. A first relevancy score for a second search result may be added to a second relevancy score for the second search result to produce a total relevancy score for the second search result. The knowledge module 118 may repeat this process for the set of search results.

In some implementations, the knowledge module 118 may determine a data entry 124 having a greatest total relevancy score from the one or more data entries 124 received from the data repository 122. When the greatest total relevancy score is greater than a relevancy threshold, the knowledge module 118 may provide response data 132 including the determined data entry 124 to a response module 134. The response module 134 associated with the query server 108 may generate the response 110 based on the responsive data entry 124 and response data 132, which may indicate the manner in which a response 110 is to be formatted or transmitted, other data for inclusion in the response 110, and so forth. For example, the response data 132 may indicate that the instructions "Click this link to access ABC Corp's Vacation Policy" are to be included in a response 110 associated with the particular data entry 124. The response data 132 may also indicate particular images or links to be included, the placement and formatting of such elements, and so forth. In cases where the response data 132 does not include content or formatting specific to a particular data entry 124, the response data 132 may include default content. For example, in the absence of response data 132 for a particular data entry 124, the text of the data entry 124 may be provided to the user device 104 as the response 110.

As mentioned above, the knowledge module 118 (and more particularly the second relevancy scoring module 128) may utilize feedback from the user 102 to refine its performance. In the illustrated example, the user 102 may interact with the user device 104 to review the response 110 and to provide feedback 148. In this instance, the feedback 148 indicates that the response 110 "Did not answer my question." The feedback 148 may be considered a feedback input to the knowledge module 118. The feedback 148 associated with a response may be determined. For example, the response 110 may include a request to indicate whether the response data 132 appropriately resolved the received query 106. If the feedback 148 corresponds to one or more threshold feedback values, such as an indication that the response was useful, the received query 106 may be stored for future comparison to subsequent queries 106. If the feedback 148 (feedback input) deviates from the threshold feedback values, such as by indicating that the response was not useful, a notification requesting human intervention to resolve the received query 106 may be generated by the knowledge module 118 and routed to an appropriate group 150 by a group routing module 130. In some implementations, the group routing module 130 may be implemented as a group routing algorithm that includes a plurality of coefficients, which may be trained to route received query q 106 to an appropriate group 150. A member of the group 150 may then produce response data 154 to reply to the received query 106. In other implementations, the group routing module 130 may be implemented as an application specific integrated circuit (ASIC) or other programmable circuit. Other implementations are also possible.

In some implementations, if a query is resolved by one or more human users, the resolution by the human user(s) may function as feedback (expert feedback), indicating that the group 150 to which the received query 106 was provided is a suitable destination for subsequent queries having similar parameters or indicating that response 110 is a suitable response 110 for subsequent queries having similar parameters. In other implementations, if a received query 106 is routed from a first user 102(1) or group 150 to a second user 102(2) or group 150 (such as from group 150(1) to group 150(2)), this re-routing may function as feedback 148 input data indicating that the second user 102(2) or group 150(2) is a suitable destination for subsequent queries having similar parameters.

In response to the feedback 148 (or optionally if the query module 120 fails to identify at least one data entry 124 that satisfies the received query 106), the knowledge module 118 may utilize a group routing module 130 to determine a group 150 of a plurality of groups 150 to which the received query 106 may be routed. Each group 150 may be comprised of one or more employees of a particular department within an organization that may be tasked with responding to queries of a particular subject matter. For example, employees of a human resources department may be tasked with responding to human resources (HR) questions, while employees of the information technology (IT) department may be tasked with responding to technology questions. Other groups 150 and other departments are also possible.

In an example, the query module 120 may retrieve one or more results that may be processed by the first relevancy scoring module 126 and the second relevancy scoring module 128 to determine a total relevancy score for each of the results. If the greatest total relevancy score of the results is below a threshold value or if the query module 120 does not find a result from the data repository 122, the knowledge module 118 may use a group routing module 130 to determine a group 150 that corresponds to subject matter of the received query 106 or the augmented query 116. The group routing module 130 may then forward the received query 106, the augmented query 116, or both to the determined group 150(3). In some implementations, such as when the response 110 was sent to the user 102 and the feedback 148 was negative, the group routing module 130 may also forward the response data 132, the data entry 124, and the feedback 148 to the determined group 150(3).

In some implementations, if no particular previous query corresponds to the augmented query 116 or received query 106, the group routing module 130 may be used to determine which group 150 the received query 106 is to be directed to for resolution. For example, if the aggregate weight value for the terms shared by each previous query and the augmented query 116 is less than a threshold value, the group routing module 130 may route the received query 106 to one of the groups 150 associated with that organization. In other implementations, if no particular previous query corresponds to the augmented query 116 or received query 106, the group routing module 130 may be used to route the received query 106 to one of the groups 150 associated with that organization.

A user 102 of the group 150(2) may review the received query 106 and other information using the device 104(3) and may generate a data entry 124 (response data 154) using the device 104(3). The response data 154 may be provided to the knowledge module 118, which may provide the response data 154 as response data 132 and data entry 124 to the response module 134. Additionally, the response data 154 may be sent to the data repository 122, which may store the response data 154 in document data 138. The data repository 122 may also store feedback data 140, including query data 142, user feedback 144, and historical event data 146.

The response module 134 may generate event data 136 for each received query 106. The event data 136 may include at least a portion of the received query 106, and data indicative of the response data 132 and the responsive data entry 124. The event data 136 may then be stored as document data 138. In some implementations the event data 136 may include data indicative of the response data 132. For example, the event data 136 may include the query text "What is ABC's recruiting policy?", the response data 132, the data entry 124, and optionally data that indicates that the response was created by a member of the "HR" group 150(2). In another example, the event data 136 may comprise information such as a query identifier that indicates a particular received query 106 and a group identifier indicative of a particular group 150(2). In some implementations, the event data 136 may be generated for groups 150 or other aggregated arrangements of queries 106.

The event data 136 associated with a particular organization may be consolidated into historical event data 146 for that organization. For example, the historical event data 146 may comprise the event data 136 associated with queries 106 made by users 102 associated with the ABC Corp. In some implementations the historical event data 146 may comprise all event data 136 for that organization since use of the system 100 began. In other implementations, the historical event data 146 may comprise a subset of all the event data 136 since use of the system 100 began. In some implementations the historical event data 146 may be limited to a last k events associated with a particular group 150, wherein k is a non-zero integer number. As described below, one or more of the event data 136 or the historical event data 146 that is associated with a particular organization may be used to train the second relevancy scoring module 128 and optionally the group routing module 130 to route queries 106 to a group 150.

In some implementations event data 136 or historical event data 146 from a plurality of organizations may be aggregated and used to inform canonical group data that may be used to train the first relevancy scoring module 126. Other implementations are also possible.

FIG. 1B depicts another implementation of the system 100 for dynamically routing and processing a received query 106, according to some implementations. As described with regard to FIG. 1A, a user device 104 may provide a query to a query server 108. For example, the received query 106 may include the text "What is Mr. Smith's current salary?". In some cases, the received query 106 may be associated with restricted or confidential information. For example, access to information associated with employee salaries, passwords, account information, and so forth, may be restricted to particular users 102. In other cases, access to information contained within a particular data repository 122 may be restricted to particular users 102 or groups of users 102, such as employees of a particular company or of a particular department within a company. Additionally, in some cases, the system 100 may include multiple data repositories 122 or other sources of data entries 124. For example, a first data repository 122(1) may store data entries 124 associated with a first company while a second data repository 122(2) stores data entries 124 associated with a second company. The information contained in data entries 124 associated with one company may not be useful to employees of other companies. Furthermore, information contained within data entries 124 associated with a particular company may be restricted, confidential, private, proprietary, and so forth, and may be intended to be viewed only by users 102 associated with the particular company.

In some implementations, prior to generation of a response 110, a received query 106 may be provided to a security module 162 associated with the query server 108. The security module 162 may determine correspondence between user data 164 associated with the received query 106 and security data 166. The user data 164 may include data indicative of a source of the received query 106, such as a particular user device 104, user account, company, location, and so forth. For example, the user data 164 may include a user identifier, such as a username or account name, a device identifier, a token value, a username and password, or other type of identifier. As another example, the user data 164 may include a telephone number, e-mail address, an Internet Protocol (IP) address or another type of network address, and so forth. The security data 166 may indicate particular elements of user data 164 that are indicative of users 102 permitted to access particular data repositories 122. For example, the security data 166 may indicate that one or more particular telephone numbers that may be determined from the user data 164 are associated with a particular company. Based on correspondence between the telephone number associated with a received query 106 and the security data 166, a particular data repository 122 associated with a particular company may be queried. Additionally, the security data 166 may indicate that one or more particular user accounts are authorized user accounts that are permitted to access particular data entries 124, data repositories 122, or other types of information. Based on correspondence between the security data 166 and the user data 164, access may be granted for the particular user to access the requested data in response to determining the user data 164 matches security data 166 of an authorized user account. In some implementations, if the user data 164 does not correspond to the security data 166, one or more notifications indicative of the attempted access may be provided to the user device 104 or to an administrator associated with the system 100. For example, a user 102 that is not authorized to access a particular data entry 124 may be provided with a response 110 indicating an individual that the user 102 should contact to resolve the query, rather than a response 110 containing information from the data entry 124. In one possible example, the user data 164 may be compared to the security data 166 to determine that the user 102 or the user device 104 is "not authorized." The determination that the user 102 or the user device 104 is "not authorized" could include an explicit determination that the user 102 is not permitted to see the requested information or may include a "null entry" situation in which the user 102 has not been given explicit permission to access data corresponding to the received query 106.

Based on the user data 164 associated with the received query 106 and the security data 166, the security module 162 may generate a security determination 168 indicative of the particular data repository 122 to be queried, and whether the user device 104 is permitted to access the particular data repository 122. In one possible example, the security module 162 may determine whether the user data 164 matches security data 166 of an authorized user account, and may generate a security determination 168 indicating that the user is permitted access to the data of the particular data repository 122. For example, based on the telephone number determined from the user data 164, the security determination 168 may indicate that the user device 104 providing the received query 106 is associated with a particular user (e.g., user "ABC") of a particular company (e.g., "Company X"). The security data 166 may further indicate particular types of restricted data, such as data associated with salaries and passwords. In other implementations, the security data 166 may indicate particular data repositories 122 or data entries 124 for which access is restricted. Correspondence between the user data 164 and the security data 166 may indicate that the user device 104 is authorized to access particular data repositories 122, data entries 124, or types of data. If the user data 164 associated with a received query 106 does not correspond to the security data 166, access to a particular data repository 122 or data entry 124 may be denied. In some cases, a notification indicative of the attempted access may be provided to an administrator of the system 100. In other cases, the response 110 provided to the user device 104 may include contact information associated with a human (or group 150) that may assist in resolving the query rather than content associated with a restricted data entry 124. For example, the group routing module 130 may determine a group 150, and the contact information for this group 150 may be provided to the user device 104.

Based in part on the security determination 168, the knowledge module 118 may access the first data repository 122(1), which may be associated with a company that corresponds to the user data 164 accompanying the received query 106. The knowledge module 118 may determine one or more data entries 124 that correspond to the parameters of the received query 106. In some implementations, a language module 112 may be used to generate an augmented query 116 based on the received query 106, as described with regard to FIG. 1A, and the knowledge module 118 may determine one or more data entries 124 that correspond to the augmented query 116. A query module 120 may determine correspondence between the determined data entries 124 and query data 142 to determine previous queries that are similar to the received query 106. Aggregate correspondence values, based on the correspondence value for each data entry 124 and the correspondence values for each previous query associated with that data entry 124, may be determined. The data entry 124 having the greatest aggregate correspondence value may be used to generate the response 110, based in part on response data 132. As described above, if the system 100 is unable to generate the response 110 using information in the data repository 122, a group routing module 130 may be used to determine which group 150 the received query 106 is to be directed to for resolution.

The system 100 in FIGS. 1A and 1B may receive feedback 148. The feedback score of each document can be expressed using lexical features according to the following equation:

$$s_{adapt}(q,d) = f^2(\psi_{lex}(q,d); \theta_2^d). \quad \text{(Equation 2)}$$

In Equation 2, the variable $\theta_2^d$ may represent a set of parameters over all documents. The variable $\Theta = \theta_2^d$ may represent the set of parameters over all documents that can be trained by empirical risk minimization (ERM) over previous queries Q. ERM attempts to minimize the errors of predictions on data determined from the data distribution based on the previous queries Q. The function $\psi_{lex}$ may represent the relevance scoring function of the second relevancy scoring module 128 configured to operate on the query q 106 and data entries d 124. The empirical risk minimization (ERM) may be expressed as follows:

$$\arg\min_\theta \sum_{(q,d),y \in Q} L\left(y, f^2(\psi_{lex}(q,d); \theta_2^d) + s_{static}(q,d)\right) + \Omega(\theta) \quad \text{(Equation 3)}$$

where the variable L represents the loss function and the variable $\Omega$ represents a regularizer across the parameters. In this example, the variable y is an element of a set of previous queries Q. Additionally, the variable of the function $\psi$ may represent the relevance scoring function for the second relevancy scoring module 128 (which may be implemented as a lexical adaptive scoring function). The expression $\theta_2^d$ may represent a set of parameters over all documents d. This setup of directly training weights over lexical or word-based features enables fast, on-line training of the second relevancy scoring module 128. However, rather than representing parameters over lexical features, it is possible to express the second relevancy score (produced by the second relevancy scoring module 128) in a dual kernelized form as follows:

$$s_{adapt}(q,d) = \beta g(\{w_d(q')s_{qsim}(q,q')\}_{q' \in Q_d^+}) - \gamma g(\{w_d(q'')s_{qsim}(q,q'')\}_{q'' \in Q_d^-}) \quad \text{(Equation 4)}$$

wherein $s_{qsim}$ represents a kernel function similarity between two queries, the variable $w_d$ represents weights function of past queries q' or q'', the variable $w_d(q') \geq 0$ is the weight of the query q' for document d and the scoring function g, $R^+ \times R^+ \times \ldots \Rightarrow R^+$ is a function that aggregates the query similarity scores, and the variables $\beta$ and $\gamma$ are constants that are greater than zero. The variable $Q_d^+$ represents query-document pairs that received positive feedback 148, and the variable $Q_d^-$ represents query-document pairs that received negative feedback 148. The equation g represents the sum function. Thus, the total relevancy score for the knowledge base article d can be determined as follows:

$$s(q,d) = f(\psi_{pairwise}(q,d)) + \beta g(\{w_d(q')s_{qsim}(q,q')\}_{q' \in Q_d^+}) - \gamma g(\{w_d(q'')s_{qsim}(q,q'')\}_{q'' \in Q_d^-}). \quad \text{(Equation 5)}$$

In Equation 5, the total relevancy score is determined based on a combination of the pairwise relevancy score (first relevancy score) and the lexical adaptive score (second relevancy score). The pairwise adaptive score is determined by a first relevancy scoring function $f(\psi_{pairwise}(q,d))$ for data entries d and queries q implemented by the first relevancy scoring module 126. The lexical adaptive score is determined by a second relevancy scoring function $\beta g(\{w_d(q')s_{qsim}(q,q')\}_{q' \in Q_d^+}) - \gamma g(\{w_d(q'')s_{qsim}(q,q'')\}_{q'' \in Q_d^-})$ for data entries d and queries q implemented by the second relevancy scoring module 128. The aggregator function g and the similarity function $s_{qsim}$ may be selected and the weights $w_d$ in Equation 5 may be trained. Additionally, the variables $\beta$ and $\gamma$ are constants that are greater than zero and can be adjusted based on the feedback 148. For example, the variables $\beta$ and $\gamma$ may be adjusted or modified by changing a first value to a second value. In another possible example, the variables $\beta$ and $\gamma$ may be adjusted or modified by replacing a first value with a second value. In another possible example, the variables $\beta$ and $\gamma$ may be adjusted or modified by adding or subtracting an adjustment value to a first value to produce a second value. Other examples are also possible.

In some implementations, the similarity function determines how similar two queries are in their intent. The similarity function may be fixed and may be constant across multiple deployments (i.e., across organizations). This function can be a kernel function like cosine similarity over Bag-of-Words (BOW), but could also include more powerful learned functions, such as neural networks. In some implementations, the similarity function $s_{qsim}$ may be implemented as a cosine similarity function with Term Frequency-Inverse Document Frequency (TF-IDF) representations over unigrams and bigrams. The TF-IDF value increases proportionally to the number of times a word appears in a document and is offset by the number of documents in the corpus that contain the word, which adjusts for the fact that some words appear more frequently in general.

In a particular example, the knowledge module 118 may use the first relevancy scoring module 126 to determine first relevancy scores for search results in a set of search results retrieved from the data repository 122. The knowledge module 118 may use the second relevancy scoring module 128 to determine second relevancy scores for the search results in the set of search results. The knowledge module 118 may determine total relevancy scores for one or more search results in the set of search results based on the first relevancy scores and the second relevancy scores. In an example, the first relevancy score of a first search result of the set of search results may be combined with the second relevancy score of the first search result to determine a total relevancy score for the first search result. The first relevancy score and the second relevancy score may be combined by adding them together. For example, the first relevancy score of a second search result of the set of search results may be combined with a second relevancy score of the second search result to determine the total relevancy score for the second search result. This process may be repeated for one or more search results of the set of search results.

To mimic empirical risk minimization, the aggregator function g may be selected to be a sum function. However, from a practical knowledge base design perspective, the aggregator function g should satisfy certain constraints including monotonicity, increasing, and bounded magnitude. In particular, the aggregator function g should monotonically increase with larger values to ensure that replacing less similar queries with more similar queries increases the score as follows:

$$g(d') \geq g(d), \forall d' \geq d, |d'| = |d|. \quad \text{(Equation 6)}$$

In this example, the relevance score function g of a previous article or data entry d' is greater than or equal to the relevance score function g of a current data entry d. The quantification $\forall$ of previous data entries d' is also greater than or equal to the score of the current data entry d. The aggregator function g should also produce output values that monotonically increase with more positive values to ensure that adding an irrelevant query does not dilute the total query similarity output as follows:

$$g(d \cup \{x\}) \geq g(d), \forall x \geq 0. \quad \text{(Equation 7)}$$

In this example, the relevance score function g union with a set of data entries x is greater than or equal to the relevance score function g of a current data entry d, and the quantification $\forall$ of the set x is greater than or equal to zero. Further, the similarity function is bounded, so the aggregator function g has a bounded magnitude as follows:

$$|s_{qsim}| \leq l \to |g| \leq cl, \quad \text{(Equation 8)}$$

for some constant c and for some pre-determined limit value l. In Equation 8, the absolute value of the similarity function is less than the pre-determined limit value l. Accordingly, the absolute value of the scoring function g is less than the pre-determined limit value l times some constant c. This constraint is motivated by practical knowledge base maintenance concerns. In general, knowledge bases change dynamically over time, as organizations add new knowledge base articles to their deployment and as old articles become less relevant. For example, last year's holiday schedule becomes less relevant and is replaced by the current year's holiday schedule. The pre-determined limit value l defined by Equation 8 enables the relevancy scoring function in Equation 5 to surface new articles over old (potentially outdated) articles with a bounded number of mistakes (determined from feedback 148). Equation 1 above shows that each article initially has a fixed static score to which the adaptive score $s_{adapt}$ is bounded. Boundedness of the adaptive score $s_{adapt}$ can be guaranteed only if the aggregator function g is bounded.

The boundedness constraint (Equation 8 above) rules out the g=sum function (suggested by the ERM approach) because the sum can grow unboundedly. Another reasonable aggregator function (average) does not satisfy the "increasing" constraint (Equation 7). In some implementations, the aggregator function g may be implemented as a sum-top-k function that computes a sum of k highest values from a set. This function's magnitude is bounded by $k|s_{qsim}|$ and it satisfies all of the above constraints. Using the function g=sum-top-k, for each new query q, the score is summed for k most similar queries from past positive (negative) queries $Q_d^+$ ($Q_d^-$), To implement the function (Equation 5), the system 100 may store queries from the user 102 and may store user feedback 148 and expert feedback (determined from response data 154), and may train the weights using an on-line learning algorithm based on the user feedback 148 and the expert feedback 156 (determined from the response data 154). For example, expert feedback 156 may be determined based on response data 154 provided by a member of the group 150, while user feedback 148 may be received from a user device 104. The on-line learning algorithm may include a version of a Perceptron-style additive update algorithm, which amounts to constant (or continuous) adjustments to query weights (initialized to zero). However, the adjustments are different for expert feedback $\delta_e$ 156 than for user feedback $\delta_u$ 148 where the expert feedback 156 is given more weight than the user feedback $\delta_e > \delta_u$. This weighting of expert feedback 156 (determined from the response data 154) more than user feedback 148 relies on a practical insight that relevance opinion of experts is more valuable than the opinion of a user 102. The system 100 uses on-line learning (rather than batch training) because responsiveness to user feedback 148 (and expert feedback 156 from the response data 154) is important for the product to demonstrate utility and to win the trust of users 102. The adjustments may include changing a first value to a second value, replacing a first value with a second value, adding an adjustment value to a first value to produce a second value, and so on. In some implementations, the expert feedback 156 may be determined from response data 154 provided by a member of the group 150. For example, if a received query 106 is routed to a group 150 and the routing is not correct, the received query 106 will be rerouted by a group member to a different group 150, which re-routing can be determined to be negative feedback 148 with respect to the routing decision by the group routing module 130. In another example, when a group member provides the response data 154, the response data 154 may be used to update the data repository 122 and may be treated as expert feedback 156. The knowledge module 118 may adjust the second relevancy scoring module 128 based on the expert feedback 156 (determined from the response data 154).

One possible example of a deployed algorithm for handling various events, including knowledge base creation, searching, and feedback, is described in the following pseudo code example of Algorithm 1.

---

ALGORITHM 1: Overview of Knowledge Module Deployed in an Organization

---

//Inputs: k is a number of queries to sum; β and γ are defined in Equation 5 above; r is a threshold confidence value; m is a maximum number of queries to store; $\delta_e$ represents a weight for expert feedback 156; $\delta_u$ represents a weight for user feedback //Train model f offline over features $\psi_{pairwise}$ to create a static score $s_{static}$ prior to deployment for time t = 1... do if new doc d created then Index d; initialize $Q_d^+ = Q_d^- = 0$ -continued ---
ALGORITHM 1: Overview of Knowledge Module Deployed in an Organization
---

```
        else if query q_t is searched then
            D ← candidate − KB − Articles(q_t)
            for d ∈ D do
                Compute s_qsim(q, q_t), ∀q ∈ Q_d
                Pick top k greatest scoring queries in Q_d^+ and Q_d^-
                Compute s(q_t, d) // as in Equation 5
            end for
                    d_max, s_max ← arg arg max(s(q_t, d)), max(s(q_t, d))
            If s_max > r, return d_max to the user
        else if received feedback y ∈ {−, +} from person u for q_t, d
                    δ ← I_{u=expert}I_{y=+}δ_e − I_{u=user}I_{y=−}δ_u
            if q_t ∈ Q_d^y (query already exists in the corresponding set) then
                w_d^y(q_t) ← w_d^y(q_t) + δ (adjust the weight)
            else
                Q_d^y ← Q_d^y ∪ {q_t}, w_d^y ← δ (add new query, initializing weight)
            end if
            Clip Q_d^y (keeping only the most recently stored m queries
        end if
end for
```

In Algorithm 1, two approximations are made to achieve a fast inference time. First, rather than ranking all of the knowledge base articles for a received query 106, a set of top 20 candidate knowledge base articles may be determined using a fast Lucerne-based retrieval system (such as Elasticsearch). The set of 20 candidate knowledge base articles may be re-ranked using Equation 5. Further, in the Lucerne index, the stored queries in $Q_d^+$ may be associated with the document d. Second, inference time of the query similarity-based kernelized form scales with the number of past queries. This time is bounded by only storing a number m of recent queries (e.g., m≈100) in $Q_d^+$ (or $Q_d^-$). Due to low query volume in the workplace domain, a limit of the number m of recent queries to approximately one hundred works well.

In general, the kernelized scoring function in Equation 4 subsumes the score in Equation 2 for common feature functions $\psi$ with appropriate choice of $s_{qsim}$, g and the constants. It is known that any scoring function that lies in the Hilbert space of a kernel K and that minimizes the empirical risk can be expressed as a linear combination of kernel values.

As a concrete example, consider a scenario where $\psi_{lex}$ represents normalized Bag-of-Words (BOW) features $\psi_{lex}$ (q,d)=tf(q)/∥tf(q)∥ where tf is a vector space representation of word frequencies and the function f' in Equation 2 is a linear function, the normalized BOW features $\psi_{lex}$ can be expressed in the Hilbert space of the cosine similarity kernel CosineSim(q1, q2)=tf($q_1$) tf($q_2$)∥tf($q_1$)∥∥tf($q_2$)∥. The scoring function over normalized BOW features at an optimum of ERM can be expressed as follows:

$$s_{adapt} = \sum_{k=1}^{T} \alpha_t \cdot CosineSim(\cdot, q_t), \quad \text{(Equation 9)}$$

for some constant $\alpha_t$. By setting the similarity function $s_{qsim}$ to be cosine similarity and g to be the sum function, and by setting $w_d$, $\beta$, and $\gamma$ appropriately, Equation 2 can be expressed as in Equation 4.

Choosing the kernelized form for implementing the second relevancy scoring module 128 using query similarity rather than explicitly storing query features with documents confers at least three practical advantages. First, such kernelization allows faster deployment of new query features. For example, in a scenario where the lexical features are changed by adding Word2Vec features to existing BOW features, the adaptive similarity model would need to be retrained and replaced for all organizations, which is a large engineering effort. In the kernelized approach used herein, the second relevancy scoring module 128 may be adjusted by replacing the old similarity function $s_{qsim}$=CosineSim with a new query similarity function $s_{qsim}$=CosineSim+Word2VecSimilarity. This replacement can be made without retraining individual models. Thus, using the query similarity kernel-based score may allow for greater agility in terms of deploying and refining new lexical features.

A second practical advantage, the kernelized approach enables explicit control over the influence of past queries (and the relative score of old documents versus new documents) by controlling the aggregation function. As discussed above, the aggregation function g may be selected to be g=sum−top−k instead of just the sum, and the relevance score function may be bounded so that the predetermined limit value l of the relevance score allows for replacement of a previously relevant document with one that is more currently relevant. For example, a holiday schedule for the year 2017 expired in the year 2018, and the new holiday schedule should become more relevant based on the date. Limiting the total relevancy score for data entries using the pre-determined limit value l enables the surfacing of a new data entry 124.

A third practical advantage is realized in that the kernelized approach allows for use of more expressive deep learning-based models by deploying deep query similarity models that are trained offline. In some implementations, it may be possible to provide deep learning and training of a deep model on-line, for example, using continuous or batch processing.

Tests of the system 100 demonstrated rapid on-line training and adaptive performance relative to other relevance systems. In Table 1, details of client data sets are shown that were used for testing.

TABLE 1

Test Datasets

| Client ID | Domains | #KB | #q | Ave. q per KB |
|---|---|---|---|---|
| 1 | HR, IT, Safety | 10 | 13 | 1.4 |
| 2 | IT, HR, Finance, Office | 135 | 192 | 1.43 |
| 3 | HR | 122 | 285 | 2.4 |
| 4 | HR, Design, Facilities | 58 | 185 | 3.21 |
| 5 | HR, Office | 202 | 384 | 1.96 |
| 6 | IT | 61 | 235 | 3.87 |
| 7 | HR, Marketing, IT, Office | 30 | 62 | 2.07 |
| 8 | Business Ops, Legal, HR | 206 | 1352 | 6.57 |
| 9 | IT, HR, OPS, Product, Customer Support | 39 | 100 | 2.62 |
| 10 | Marketing, Sales, Product, Data Analysis | 38 | 51 | 1.42 |
| 11 | Knowledge | 25 | 56 | 2.24 |
| 12 | Legal, Product, HR, Ops, IT, Education, Engineering | 102 | 385 | 3.78 |

With respect to training, the data set of Table 1 was obtained from real world feedback from 12 clients. The clients were chosen based on a high level of product engagement and diversity of use cases they cover. The data set may be generated as a result of users 102 from that organization naturally interacting with an older version of the system 100. Each event was time stamped and was associated with one of the following types:

1. Knowledge base creation or addition: a knowledge base article d is created or modified;
2. Knowledge base deletion: a knowledge base article d is deleted;
3. Query search and feedback: tuple (q, d, u, y) where a user u 102 searches with a received query q 106; the system 100 responds with an article d (data entry 124) and the user 102 provides feedback (y∈{+,−} (feedback 148); and
4. Expert feedback 156: tuple (q, d, e, +) for cases where the system 100 could not answer the received query q 106, and a domain expert e (from one of the groups 150) responded with a new article d (response data 154).

For training, tuples with negative feedback are discarded for off-line training and evaluation because the negative feedback does not provide the ground truth.

To train the parameters of the first relevancy scoring module 126, a dataset was created that included 364 questions matched to 83 knowledge base articles. The knowledge base questions were selected from 12 common workplace domains: Information Technology (IT), Human Resources (HR), Engineering, Legal, Design, Facilities, Finance, Security, Recruiting, Events, Sales, and Office Administration. For each question, there is a single unique knowledge base answer.

The offline model ($s_{static}$) was trained on the artificial dataset. For simplicity, a linear model for the first relevancy scoring module $s_{static}$ 126 was used. The hyperparameters β (weight of positive queries) and γ (weight of negative queries), $δ_e$ (weight adjustment for expert feedback 156), $δ_u$ (weight adjustment for user feedback), and r (score threshold) were tuned on the development data from four of the clients, picking the parameters that maximize the total micro F1. The development data was excluded from evaluation.

The client dataset was used for evaluation. For each query, there is at most one correct answer. In this sense, the task differs from common information retrieval ranking tasks. For each dataset, real user and expert feedback 156 are simulated. Algorithm 1 is run over the events in the order of timestamps. Negative or positive feedback 148 are provided using ground truth. When the system 100 makes a mistake, the correct knowledge base article is revealed only when the event corresponds to expert feedback 156, as that is the role of experts. The search algorithms were evaluated using the following metrics:

$$\text{Precision} = \frac{\text{\# algorithm answers with correct answer}}{\text{\# algorithm responds with an answer}} \quad \text{(Equation 10)}$$

$$\text{Recall} = \frac{\text{\# algorithm answers with correct answer}}{\text{\# queries with a valid KB answer}} \quad \text{(Equation 11)}$$

$$F1 = \frac{2 \, \text{Precision} \, \text{Recall}}{\text{Precision} + \text{Recall}} \quad \text{(Equation 12)}$$

$$MRR = \frac{1}{|q, d, y = +|} \sum_{(q,d,y=+)} \frac{1}{\text{rank of } a \text{ by algorithm}} \quad \text{(Equation 13)}$$

where MRR refers to the mean reciprocal rank.

The implementation in the knowledge module 118 of the system 100 was compared with two strong baselines: the BM25 algorithm (the de facto standard available in publicly available search software, such as Apache Solr) and the static pairwise match baseline (only $s_{static}$) trained with the artificial data as well as the development data used to train the first relevancy scoring module 126.

For the static algorithm, we use match feature templates described below in Table 2.

TABLE 2

Feature Templates for Static Scoring

| Feature | Description |
|---|---|
| LemmaComparison | Compare lemma in query and text |
| Term Match | Unigram and bigram dot product |
| Synonym Match | Term overlap with synonyms |
| Wor2Vec Match | IDF-weighted word2vec dot product |
| Acronym Match | Query and Text Acronym Overlap |

For term match, the static algorithm used modified term frequency representations to normalize for document length. For synonyms, the algorithm used the PPDB dataset. For word vectors, the static algorithm used GLOVE embeddings. The features were computed with the query and four textual items obtained from the knowledge base: Title, Body, Keywords, and All (Title, Body, and Keywords concatenated).

The results are shown in Table 3 below. Table 3 depicts performance attributes of two different similarity algorithms as compared to the learn-to-rank algorithm described in Equation 5 above.

TABLE 3

Performance Attributes

| Data | BM25 | | | | Static L2R (artificial + Client) | | | | Equation 5 (herein) | | | | |
| --- | --- | --- | --- | --- | --- | --- | --- | --- | --- | --- | --- | --- | --- |
| ID | Prec | Rec | F1 | MRR | Prec | Rec | F1 | MRR | Prec | Rec | F1 | MRR | ΔF1 % |
| 1 | 0.71 | 0.71 | 0.71 | 0.733 | 1 | 0.85 | 0.92 | 0.939 | 1 | 0.85 | 0.923 | 0.939 | 0 |
| 2 | 0.37 | 0.4 | 0.38 | 0.567 | 0.71 | 0.64 | 0.67 | 0.864 | 0.80 | 0.76 | 0.786 | 0.9 | 15.8 |
| 3 | 0.67 | 0.63 | 0.63 | 0.708 | 0.85 | 0.76 | 0.80 | 0.896 | 0.90 | 0.80 | 0.851 | 0.915 | 5.6 |
| 4 | 0.56 | 0.65 | 0.60 | 0.765 | 0.58 | 0.76 | 0.66 | 0.906 | 0.68 | 0.77 | 0.725 | 0.936 | 9.8 |
| 5 | 0.64 | 0.68 | 0.66 | 0.708 | 0.76 | 0.73 | 0.74 | 0.856 | 0.80 | 0.74 | 0.771 | 0.868 | 3.4 |
| 6 | 0.35 | 0.55 | 0.43 | 0.596 | 0.29 | 0.64 | 0.40 | 0.807 | 0.46 | 0.74 | 0.574 | 0.886 | 41 |
| 7 | 0.55 | 0.71 | 0.62 | 0.801 | 0.60 | 0.77 | 0.68 | 0.877 | 0.63 | 0.77 | 0.7 | 0.87 | 2.8 |
| 8 | 0.37 | 0.38 | 0.38 | 0.562 | 0.60 | 0.54 | 0.57 | 0.753 | 0.73 | 0.71 | 0.724 | 0.851 | 25.7 |
| 9 | 0.61 | 0.66 | 0.64 | 0.802 | 0.79 | 0.77 | 0.78 | 0.948 | 0.83 | 0.76 | 0.796 | 0.948 | 1.3 |
| 10 | 0.51 | 0.62 | 0.56 | 0.763 | 0.49 | 0.71 | 0.58 | 0.92 | 0.57 | 0.75 | 0.651 | 0.923 | 11.5 |
| 11 | 0.86 | 0.89 | 0.87 | 0.887 | 0.94 | 0.91 | 0.92 | 0.971 | 0.96 | 0.89 | 0.926 | 0.971 | −0.1 |
| 12 | 0.73 | 0.74 | 0.73 | 0.839 | 0.89 | 0.63 | 0.74 | 0.91 | 0.91 | 0.71 | 0.803 | 0.939 | 8.4 |
| Avg. | 0.57 | 0.64 | 0.60 | 0.731 | 0.71 | 0.73 | 0.71 | 0.887 | 0.77 | 0.77 | 0.769 | 0.912 | 10.43 |

Comparing precisions, recall, F1, and MRR, the implementation employed by the knowledge module 118 of the system 100 demonstrated relative F1 improvements over the static baseline. The static L2R approach vastly outperforms the BM 25 algorithm (17.5% relative improvement in average 51). The knowledge module 118 provided significant improvements over the static L2R (10.4% improvement on average, and up to 41% improvement with respect to the IT knowledge base associated with the client identifier number 6 (described in Table 1)). Further, the mean reciprocal rank (MRR) showed an average improvement of 2.8% relative to the static L2R approach. Further, the Pearson correlation coefficient between the ΔF1 in Table 3 demonstrates an average query per knowledge base article (d) is 0.66. This value hints that incorporating adaptive learning is more likely to help for cases with higher queries per knowledge base article.

Table 4 depicts real world examples in which the knowledge module 118 learned after one mistake and returned a correct result for a different but related query. Table 4 also shows a predicted response using only the static similarity score, which does not adapt.

TABLE 4

System Responses

| Queries | Correct Article | Article for Knowledge Module | Article for Static Similarity |
| --- | --- | --- | --- |
| Query 1: How many people work at <company>? | Title: Headcount Body: To find the most up to date headcount in any office, log into <xx> and select 'People' in the top left hand corner . . . | Title: <Company> LinkedIn Body: At <Company>, we're dedicated to improving customer lending . . . | Title: <Company> LinkedIn Body: At <Company>, we're dedicated to improving customer lending . . . |
| Query 2: In the New York City Office, how many people are there? | Title: Headcount Body: To find the most up to date headcount in any office, log into <xx> and select 'People' in the top left hand corner . . . | Title: Headcount Body: To find the most up to date headcount in any office, log into <xx> and select 'People' in the top left hand corner . . . | Title: <Company> New York Office Info Body: <link to document containing address and phone number of New York Office> |
| Query 3: How do I contact customer Support? | Title: What are our office phone extensions? Body: Our main phone number is <xxxxxxxxxx>. Phone extension are as follows: 0 Customer Service, 1 Sales, . . . | Title: Customer Support Principles Body: Our number one priority is doing right by our customers and treating every customer interaction as a chance to build our brand . . . | Title: Customer Support Principles Body: Our number one priority is doing right by our customers and treating every customer interaction as a chance to build our brand . . . |
| Query 4: What is the phone number for customer support? | Title: What are our office phone extensions? Body: Our main phone number is <xxxxxxxxxx>. Phone extension are as follows: 0 Customer Service, 1 Sales, . . . | Title: What are our office phone extensions? Body: Our main phone number is <xxxxxxxxxx>. Phone extension are as follows: 0 Customer Service, 1 Sales, . . . | Title: Customer Support Principles Body: Our number one priority is doing right by our customers and treating every customer interaction as a chance to build our brand . . . |
| Query 5: How do I get my medical card? | Title: Benefit ID Card Body: The social security number of the primary subscriber (company employee) can be used . . . | Title: Circle Medical Cost and Sign Up Body: Cost: Circle Medical does no accept Kaiser plans. Sign Up . . . | Title: Circle Medical Cost and Sign Up Body: Cost: Circle Medical does no accept Kaiser plans. Sign Up . . . |

TABLE 4-continued

System Responses

| Queries | Correct Article | Article for Knowledge Module | Article for Static Similarity |
|---|---|---|---|
| Query 6: How can I get a copy of my medical insurance card? | Title: Benefit ID Card Body: The social security number of the primary subscriber (company employee) can be used . . . | Title: Benefit ID Card Body: The social security number of the primary subscriber (company employee) can be used . . . | Title: Circle Medical Cost and Sign Up Body: Cost: Circle Medical does no accept Kaiser plans. Sign Up . . . |

As shown, three cases of corrected responses by the knowledge module 118 are shown that are based on query feedback 148. In this example, the knowledge module 118 gets the first answer wrong, but returns the correct answer in response to the next query by learning from the feedback 148.

Figure 2:
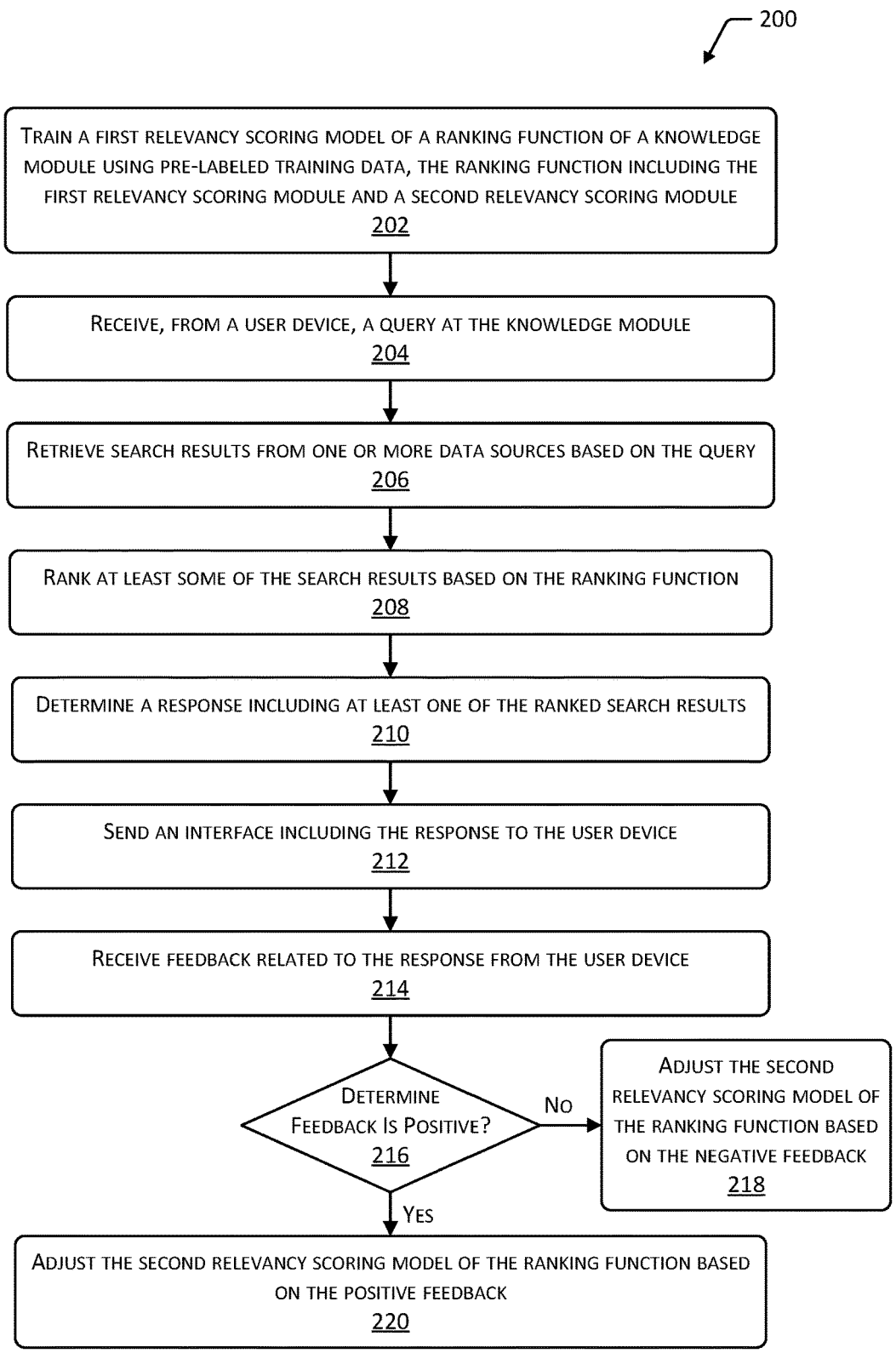
FIG. 2 depicts a flow diagram of a method of adjusting a lexical adaptive model in response to feedback, according to one possible implementation.

FIG. 2 depicts a flow diagram 200 of a method of adjusting a second relevancy scoring model in response to feedback 148, according to one possible implementation. In some implementations, the method may be performed by the knowledge module 118 in the background.

At 202, a first relevancy scoring module 126 of a ranking function of a knowledge module 118 is trained using pre-labeled training data. The ranking function may include the first relevancy scoring module 126 and a second relevancy scoring module 128. For example, as discussed above, a dataset was created that included 364 questions matched to 83 knowledge base articles. The knowledge base questions were selected from 12 common workplace domains: IT, HR, Engineering, Legal, Design, Facilities, Finance, Security, Recruiting, Events, Sales, and Office Administration. For each question, there is a single unique knowledge base answer. The dataset may include a plurality of queries with associated timestamps and response data, which may be provided to the first relevancy scoring module 126.

At 204, a received query 106 is received at the knowledge module 118 from a user device 104. The received query 106 may include a natural language input. In some implementations, the knowledge module 118 may receive an augmented query 116.

At 206, search results are retrieved from one or more data sources based on the received query 106. For example, the knowledge module 118 may retrieve one or more data entries 124 from a data repository 122. The one or more data entries 124 may be retrieved based on pairwise matches between the received query 106 (or augmented query 116) and the data entries 124 within the data repository 122. The data entries 124 may include articles or documents.

At 208, at least some of the search results are ranked based on the ranking function. For example, the search results may be retrieved or received with an initial ranking based on some relevancy determination. A number (k) of the search results (data entries 124) may be re-ranked according to the ranking function to determine a relevancy rank for each of the number of data entries 124.

At 210, a response is determined including at least one of the ranked search results. In some implementations, there may be only one correct response. The determined ranked search result may be a search result with a greatest total relevancy rank relative to other data entries 124 of the re-ranked search results.

At 212, an interface including the response is sent to the user device 104. In some implementations, the interface may include data corresponding to the data entry 124, a selectable link, other information, or any combination thereof. Further, the interface may include a selectable option accessible by a user 102 to provide feedback.

At 214, feedback 148 related to the response is received from the user device 104. The feedback 148 may include positive feedback 148 or negative feedback 148. Further, the feedback 148 may be from a user 102, while expert feedback 156 may be from an expert, such as a member of a group 150.

At 216, it is determined whether the feedback (user feedback 148 or expert feedback 156) is positive. If the feedback 148 is not positive, the second relevancy scoring module 128 of the ranking function is adjusted based on the negative feedback 148, at 218. Similarly, negative feedback determined from the expert feedback 156 may be used to determine one or more coefficients of the second relevancy scoring module 128. For example, in Equation 5, the hyperparameter γ may be adjusted based on the feedback 148 and optionally the feedback 156 to decrease the relevancy of the particular data entry 124.

Otherwise, if the feedback 148 or the feedback 156 is positive, the second relevancy scoring module of the ranking function is adjusted based on the positive feedback, at 220. For example, the hyperparameter β in Equation 5 may be increased based on the feedback 148 to increase the relevancy of the particular data entry 124. Similarly, the hyperparameter β in Equation 5 may be increased based on expert feedback 156 with respect to a particular data entry 124. Other implementations are also possible.

Figure 3:
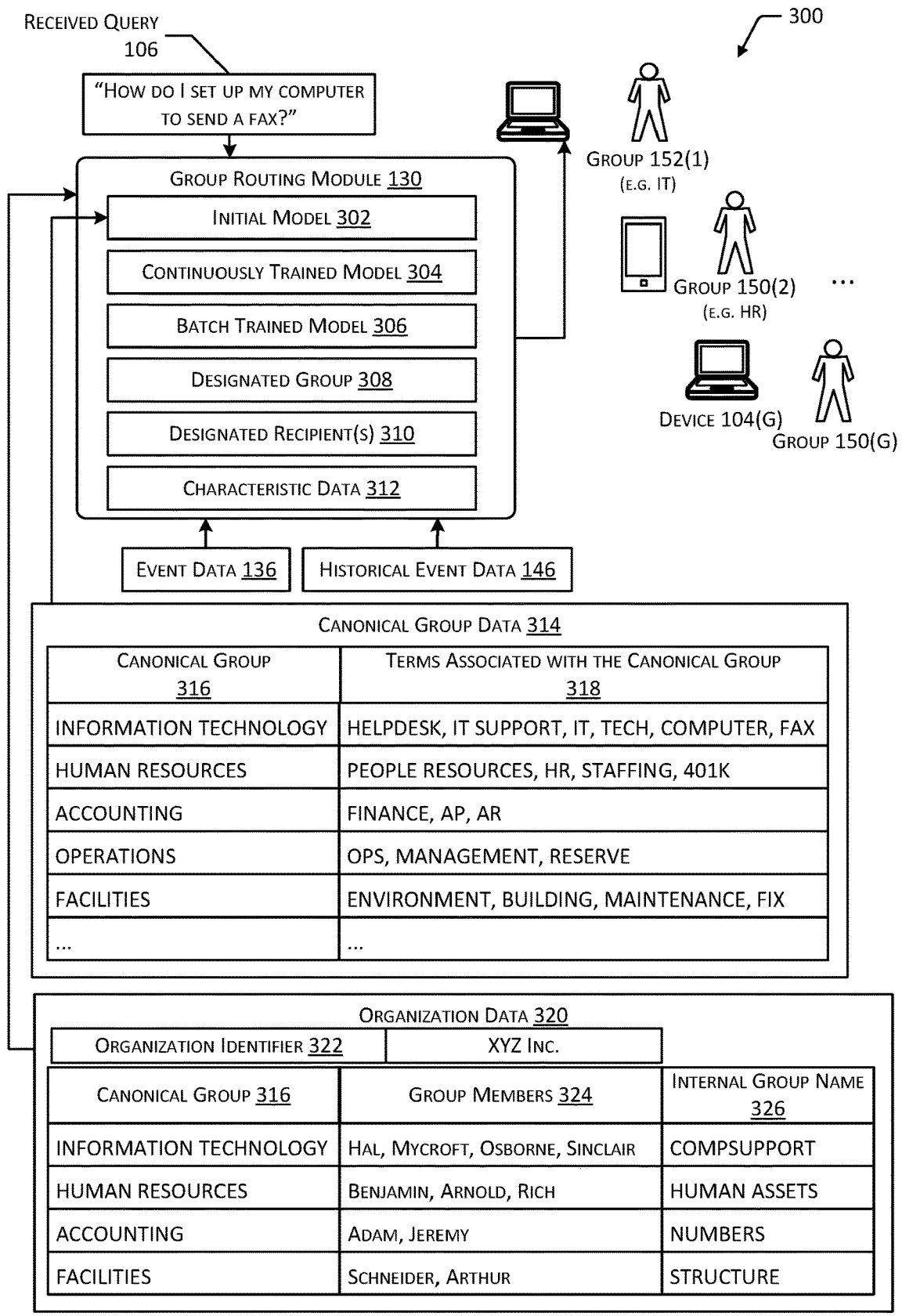
FIG. 3 depicts three models and associated data that may be used to route a query, according to one implementation.

FIG. 3 depicts systems that utilize three models to route a received query 106, according to one implementation. During different phases of usage of the system 100 by an organization, queries 106 are dynamically routed by the group routing module 130 using one or more of an initial model 302, a continuously trained model 304, and a batch trained model 306.

The group routing module 130 produces an output of a designated group 308, which may identify one of the groups 150 for responding to a received query 106. The designated group 308 comprises data indicative of the group 150 to which a particular received query 106 or group of received queries 106 is to be routed for further processing. For example, the designated group 308 may indicate a particular received query 106 is to be handled by the "information technology" group 150(1). In some implementations the designated group 308 may include information, such as one or more designated recipients 310 who may be part of the group 150. For example, the designated recipients 310 for the "information technology" group 150(1) may include group members 324, such as "Hal", "Mycroft", "Osborne", and "Sinclair".

The group routing module 130 may use characteristic data 312 to determine when to transition between using the continuously trained model 304 and the batch trained model 306. When one or more values of the characteristic data 312 meet or exceed a transition threshold, the group routing module 130 may transition between the continuously trained model 304 and the batch trained model 306. For example, as the number of queries 106 from a particular organization that are processed exceeds a threshold count, the group routing module 130 may transition from using the continuously trained model 304 to the batch trained model 306.

The initial model 302 may include canonical group data 314. The canonical group data 314 may comprise one or more canonical groups 316 and those terms associated with each of the canonical groups 318. For example, the canonical group 316 "information technology" is associated with terms "helpdesk", "IT support", "IT", "tech", "computer", and "FAX".

The canonical group data 314 may be generated based on information from a variety of difference sources, including the historical event data 146 associated with a plurality of different organizations. The canonical group data 314 is not associated with a particular organization. In some implementations, however, the canonical group data 314 may be associated with particular industries. For example, canonical group data 314 may be generated that is specific to healthcare, government, private business, publicly traded business, and so forth. The canonical group data 314 may also include manual entries or may be constructed using data from other sources.

Organization data 320 is specific to a particular organization. For example, the organization data 320 presented here is associated with an organization identifier 322 of "XYZ Inc." The organization data 320 provides an association between particular canonical groups 316 and group members 324. The group members 324 may be employees, contractors, vendors, or other individuals or organizations that are affiliated with the organization. The organization data 320 may also include internal group names 326. For example, XYZ Inc. may refer to their "information technology" group 150 as "Compsupport" while they refer to the "human resources" group 150 as "human assets", and so forth. In some implementations, the internal group names 326 may also be used as input to determine routing of the received queries 106.

Figure 4:
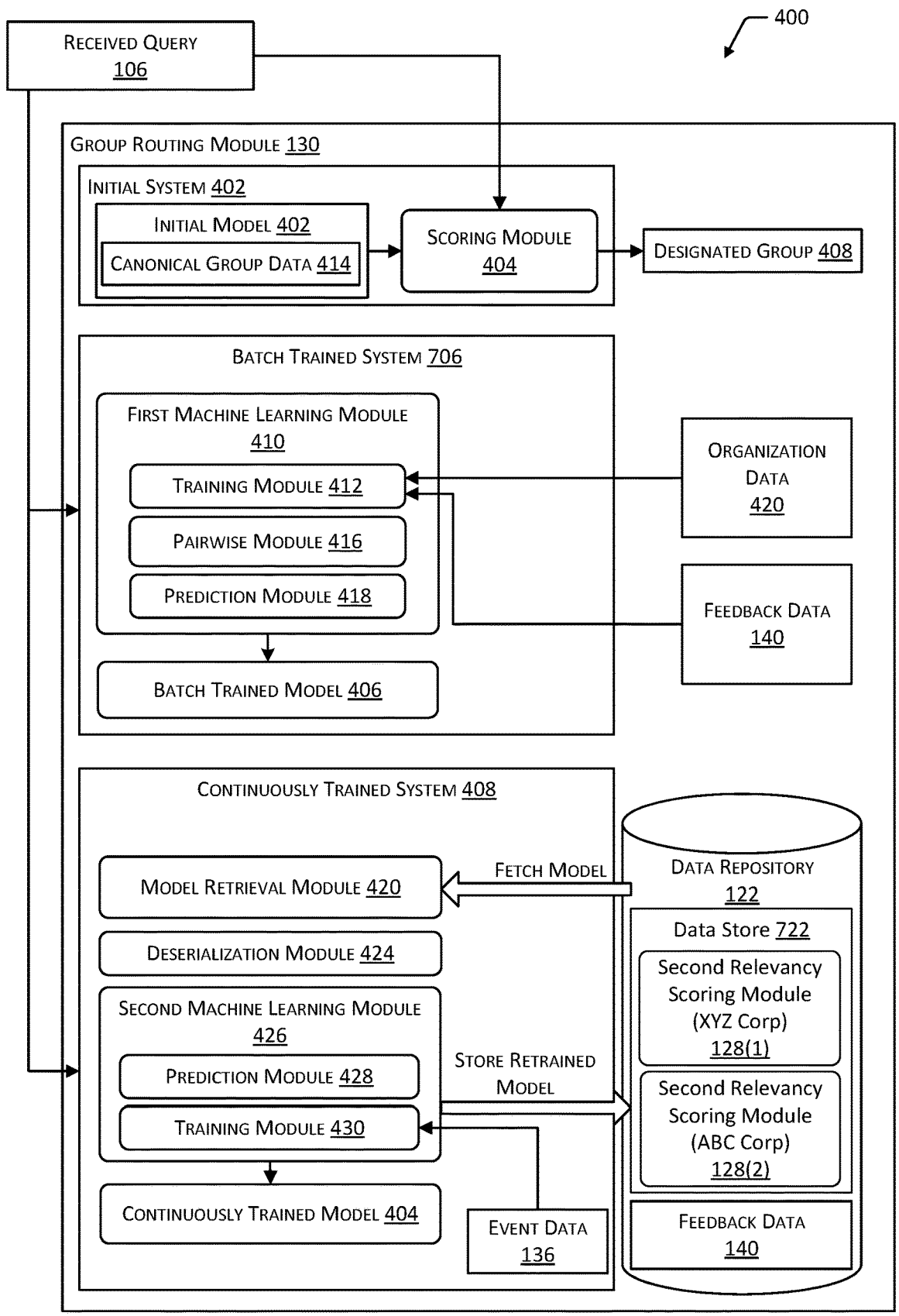
FIG. 4 depicts a group routing module including systems that utilize the three models to route queries, according to one implementation.

FIG. 4 depicts a system 400 including a group routing module 130 that utilizes three models to determine a designated group 308 for a particular received query 106, according to one implementation. Each of the three models described above may be used by a respective system to generate a designated group 308. In some implementations these systems may comprise processors executing one or more computer-executable instructions.

An initial system 402 may adjust and use the initial model 302. For example, the initial system 402 may modify one or more coefficients of the initial model 302. A batch trained system 406 may adjust and use the batch trained model 306. For example, the batch trained system 406 may modify one or more coefficients of the batch trained model 306. A continuously trained system 408 may adjust and use the continuously trained model 304. For example, the continuously trained system 408 may modify one or more coefficients of the continuously trained model 304. In one possible example, the one or more coefficients of the initial model 302, the batch trained model 306, and the continuously trained model 304 may be adjusted or modified by changing an existing entry from a first value to a second value. In another possible example, the one or more coefficients of the initial model 302, the batch trained model 306, and the continuously trained model 304 may be adjusted (or modified) by replacing a first value with a second value. In another possible example, the one or more coefficients of the initial model 302, the batch trained model 306, and the continuously trained model 304 may be adjusted (or modified) by adding an adjustment value to a first value or first coefficient to produce a second value. Other examples are also possible.

The initial system 402 uses as input the received query 106, or data based at least in part thereon. A scoring module 404 may use the received query 106 and the initial model 302 to select a designated group 308 from the canonical groups 316 indicated in the canonical group data 314. The scoring module 404 may generate a score for one or more of the canonical groups 316. If the greatest (highest) scoring canonical group 316 exceeds a minimum score threshold, the greatest scoring canonical group 316 is output as the designated group 308. In other implementations, other techniques may be used. For example, a classifier may be used to process the received query 106 and generate the designated group 308.

The initial system 402 is not specific to a particular organization. As described above, the initial model 302 may be generated based on data from one or more of a plurality of organizations, manual input, or other data sources. The initial system 402 provides a mechanism for at least some queries 106 to be routed appropriately during the initial use of the system 100 by an organization, before sufficient event data 136 or historical event data 146 is available to train the other models.

The system 400 may further include a batch trained system 406 and a continuously trained system 408. The batch trained system 406 may include a first machine learning module 410. The first machine learning module 410 may utilize one or more elements from the TensorFlow open-source software library as promulgated at www.tensorflow.org, the OpenNN library promulgated at www.opennn.net, the Deeplearning4j library promulgated at deeplearning4j.org, and so forth.

The first machine learning module 410 may include a training module 412 that may use organization data 320 and feedback data 140 to train a pairwise module 416 and a prediction module 418 to produce a batch trained model 306, which may be used to determine a group 150 to which a received query 106 is to be routed when no article in the knowledge base corresponds to the received query 106. The batch trained model 306 may be periodically trained based on feedback data 140 from the data repository 122, for example, to adjust (or modify) one or more parameters of the group routing module 130. In another example the batch trained model 306 may be trained based on a count of the feedback data 140. For example, the batch trained model 306 may be trained on a set of feedback inputs when the count exceeds a feedback threshold. In one possible example, the feedback threshold may be 10 feedback inputs, 5 feedback inputs, 100 feedback inputs, or another number of feedback inputs. The feedback input may include feedback data 140 that is received by the knowledge module 118.

Feedback 148 associated with a response 110 may be determined. For example, a user 102 receiving a response 110 may be requested to indicate whether the response 110 appropriately resolved the received query 106. If the feedback data 140 corresponds to one or more threshold feedback values, such as an indication that the response 110 was useful, the received query 106 may be stored for future comparison to subsequent queries. If the feedback data 140 deviates from the threshold feedback values, such as by indicating that the response 110 was not useful, a notification requesting human intervention to resolve the received query 106 may be generated. In some implementations, if a received query 106 is resolved by one or more human users 102, the resolution by the human user(s) may function as feedback data 140, indicating that the group 150 to which the received query 106 was provided is a suitable destination for subsequent queries having similar parameters. In other implementations, if a received query 106 is routed from a first user 102 or group 150 to a second user 102 or group 150, this routing may function as feedback data 140 indicating that the second user 102 or group 150 is a suitable destination for subsequent queries having similar parameters. In another possible example, the batch trained model 306 may be trained based on a count of user feedback 148 exceeding a count threshold or based on a triggering event, such as receiving expert feedback (which may be determined from response data 154 produced by a member of a group 150). Other implementations are also possible.

The training module 412 may use organization data 320 which may include a list of departments (groups 150) and associated keywords. In some implementations, the training module 412 may be trained using a pre-labeled dataset. Further, in some implementations, historical event data 146 may be used by the first machine learning module 410 to generate the batch trained model 306. For example, the historical event data 146 that is associated with the organization XYZ Inc. may be used to generate the batch trained model 306 that is specific to that organization. In some implementations the batch trained system 406 may be used to adjust parameters of or re-train the batch trained model 306 at particular intervals, such as daily, hourly, or at some other interval. In other embodiments, the batch trained system 406 may adjust parameters of or generate the batch trained model 306 based on a count of the number of queries 106. For example, the batch trained system 406 may adjust parameters of the batch trained model 306 after every 10 queries 106, after every 50 queries 106, after another number of queries 106, and so forth. In some implementations, the batch trained system 406 initiates generation of a new batch trained model 306 responsive to one or more occurrences. For example, addition of a group 150 or removal of a group 150 from an organization may trigger operation of the batch trained system 406.

Once the batch trained model 306 has been generated, the group routing module 130 may use the batch trained model 306 to determine the designated group 308 associated with a particular received query 106. In some implementations, the batch trained model 306 may produce a set of possible groups 150 with associated confidence values. The set may be ranked, and the greatest ranked group 150 may be selected as the designated group 308.

The continuously trained system 408 may include a model retrieval module 420. The model retrieval module 420 may be used to retrieve, from the data repository 122, the second relevancy scoring module 128 that is associated with the received query 106. The continuously trained model 304 may be specific to a particular organization. The model retrieval module 420 may fetch the continuously trained model 304 from a data store 422. For example, this fetch may include transferring the continuously trained model 304 over a network connection from one server to another.

A deserialization module 424 deserializes the continuously trained model 304 for use by a second machine learning module 426. The second machine learning module 426 may include a prediction module 428 and a training module 430. The second machine learning module 426 may utilize one or more elements from the TensorFlow open-source software library as promulgated at www.tensorflow.org, the OpenNN library promulgated at www.opennn.net, the Deeplearning4j library promulgated at deeplearning4j.org, and so forth. The second machine learning module 426 may utilize one or more neural networks, deep learning neural networks, convolutional neural networks, classifiers, and so forth.

The prediction module 428 may accept the received query 106 as input and produce a designated group 308 as output. In some implementations, the prediction module 428 may produce a set of possible groups 150 with associated confidence values. The set may be ranked, and the greatest ranked group 150 may be selected as the designated group 308. The second machine learning module 426 may also generate the continuously trained model 304.

The training module 420 may use event data 136 to retrain the continuously trained model 304. The retraining involves operation of the model retrieval module 420 to fetch the continuously trained model 304 (e.g., a second relevancy scoring module 128) from the datastore 422, and subsequent deserialization by the deserialization module 424. The retraining may occur on very short timescales, such as a few seconds. For example, as new event data 136 becomes available, the training module 430 may retrain the continuously trained model 304 based on the new event data 136.

As training continues, the size of the continuously trained model 304 may increase. As a result, the continuously trained model 304 may exceed the storage limits of the data store 422. Operation of the continuously trained model 304 uses network bandwidth for the fetches of the continuously trained model 304 from the datastore 422. As a result, network bandwidth usage, and latency when generating the designated group 308 may increase as the size of the model increases.

The batch trained system 406 may provide advantages over the continuously trained system 408. The batch trained model 306 may be stored and accessed differently, removing the need for a fetch over a network and deserialization. As a result, latency and bandwidth usage are decreased. The batch trained system 406 does not encounter the race condition issues described above. The batch trained system 406 is also more scalable, allowing for many more groups 150 to be supported, compared to the continuously trained system 408.

By using the techniques described above, each of the initial system 402, the continuously trained system 408, and the batch trained system 406 may be used during phases of operation in which they provide the greatest improvement to system performance. For example, during initial use when little or no event data 136 or historical event data 146 is available, the initial system 402 allows for at least some of the queries 106 to be routed to appropriate groups 150 for resolution. As event data 136 is produced, the designated group 308 provided by the continuously trained system 408 increases in confidence value and is subsequently used. As historical event data 146 is available, the batch trained system 406 may be trained using the historical event data 146, and routing determinations may be made by the batch trained system 406 while use of the continuously trained system 408 is discontinued. Alternatively, the continuously trained system 408 may switch to a batch approach. Other implementations are also possible.

Figure 5A:
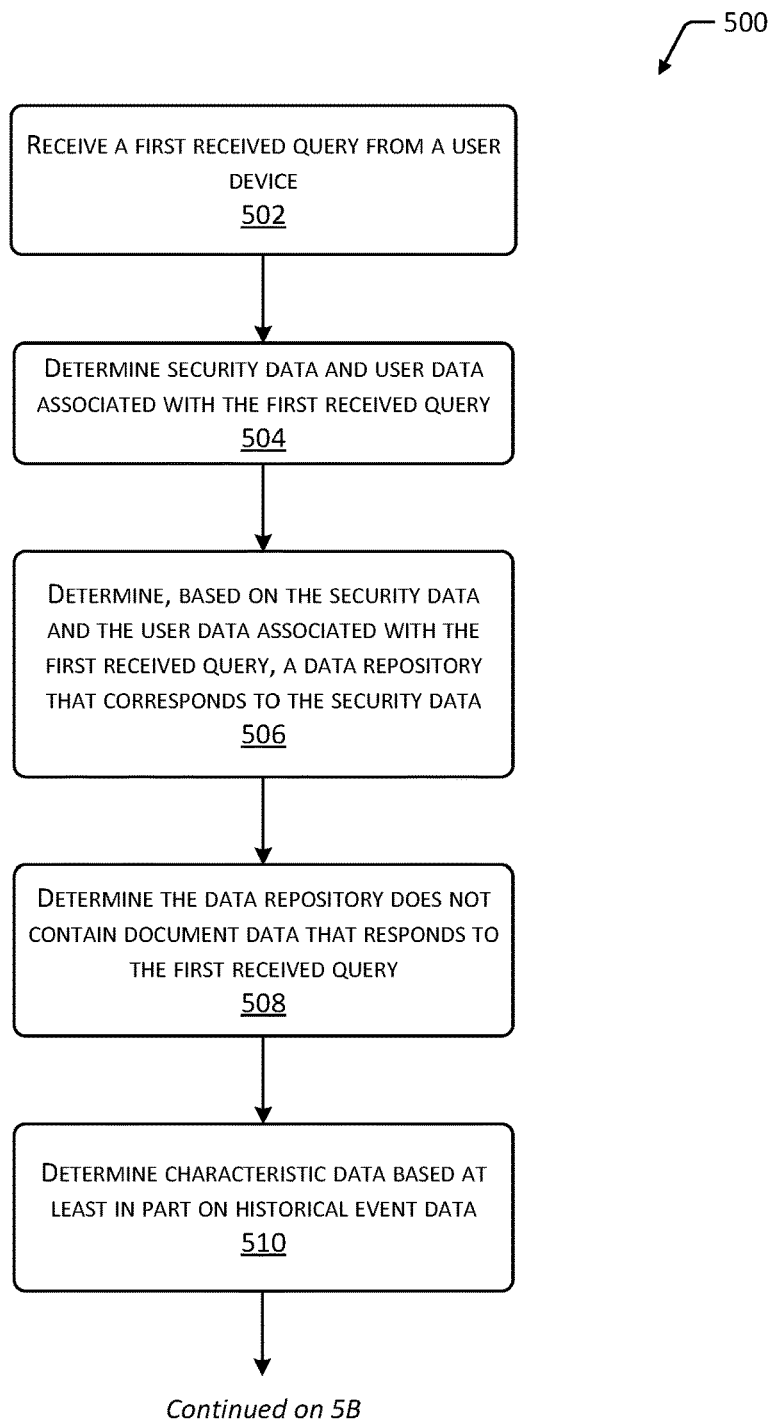
FIGS. 5A and 5B are a flow diagram illustrating a method for dynamically routing queries to particular groups using different models, according to one implementation.
Figure 5B:
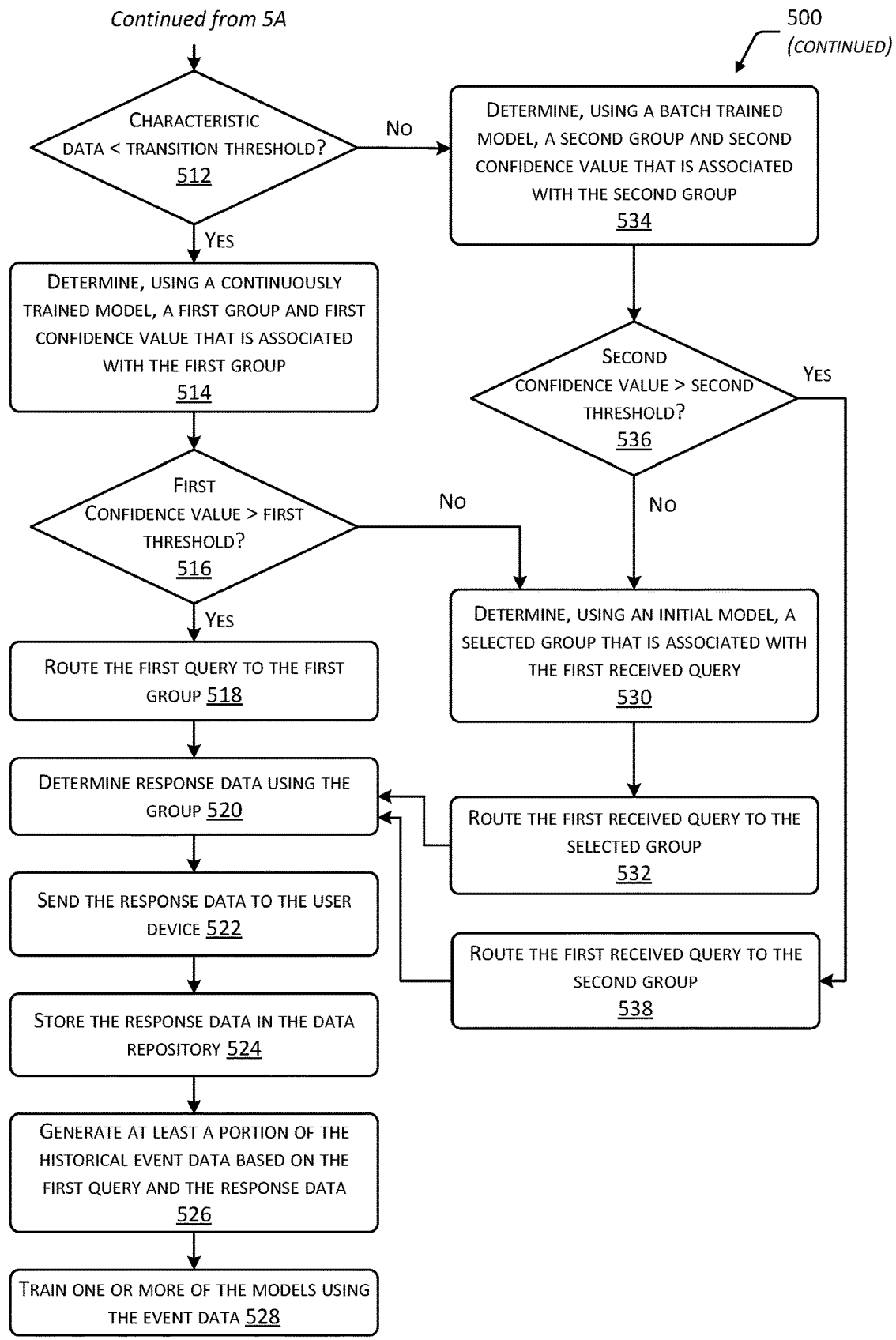

FIGS. 5A and 5B depict a flow diagram 500 illustrating a method for dynamically routing queries to particular groups using different models, according to one implementation. In some implementations the method may be performed at least in part by the group routing module 130.

At 502 a first received query 106 is received from a user device 104. The first received query 106 may include various parameters, such as keywords, groups of words, arrangements of words, formats of words or letters, punctuation, and so forth.

At 504 security data 166 and user data 164 associated with the first received query 106 are determined. For example, the user data 164 may indicate that the first received query 106 is associated with user ID "ABC" and phone number "123-456-7890". The security data 166 may indicate that user ID "ABC" and the phone number "123-456-7890" is authorized to access information associated with company "X". In another example, the security data 166 may include username and password data, a unique pin, other authentication data, or any combination thereof.

At 506 based on the security data 166 and the user data 164 associated with the first received query 106, a data repository 122 that corresponds to the source of the first received query 106 is determined. Continuing the example, the data repository 122 may be associated with company "ABC". In some implementations, the system 100 may include multiple data repositories 122, where the data from each organization may be siloed so that the data for one organization is not shared with users of other organizations. Data access may be managed based on the security data 166.

At 508 a determination is made that the data repository 122 does not contain information to respond to the first received query 106. For example, the system 100 as described above with respect to FIGS. 1A and 1B may determine that there are no data entries 124 suitable to provide a response 110, or that a confidence value or weight associated with the identified data entries 124 are below a threshold value.

At 510 characteristic data is determined based at least in part on historical event data 146. The characteristic data comprises information that is indicative of operation of the system 100 with respect to a particular organization, or portion thereof. For example, the characteristic data may be indicative of one or more of a count of queries (previously received queries) processed by the system 100 for that organization, a count of queries (previously received queries) processed by the system 100 for that organization that are associated with a particular group 150 in that organization, a count of queries that are routed using one of the company-specific models, a length of time since use of the system 100 by the organization began, and so forth. Continuing the example, the characteristic data associated with Company ABC may be determined to indicate that the system 100 has processed 517 received queries 106.

At 512 a determination is made as to whether the characteristic data is less than a transition threshold. If the characteristic data is less than the transition threshold, the method proceeds to 514.

At 514 a determination is made, using a continuously trained model, of a first group and of a first confidence value that is associated with the first group. For example, the continuously trained model may use a machine learning algorithm that is adjusted in real-time or near real-time using the event data 136 from previous queries. The continuously trained model may generate a set of possible groups 150, with a first confidence value for each group 150 in the set of possible groups 150. The first confidence value may be indicative of a likelihood that the associated group 150 is correctly determined. The groups 150 in the set of possible groups 150 may be ranked by the first confidence value. The greatest ranking group in the set of possible groups 150 may be designated as the first group (such as group 150(1)). For example, the greatest ranking group 150(1) may be "information technology".

At 516 a determination is made as to whether the first confidence value is greater than the first threshold. If so, the method proceeds to 518.

At 518 the first received query 106 is routed to the first group 150(1). Continuing the example, the first received query 106 may be routed to the "information technology" group 150(1). The routing may comprise sending or otherwise presenting or making accessible at least a portion of the first received query 106 to one or more members of the group 150(1). For example, the first received query 106 may be presented to the members of the group 150(1) using one or more user devices 104(2).

In some situations, the first group 150(1) may not be appropriate to respond to the first received query 106. For example, the first received query 106 may have been misrouted, responsibilities of the group 150(1) may have changed, and so forth. A member of the group 150(1) may re-route the first received query 106 to another group 150 (such as group 150(3)).

At 520 the response data 132 is determined using the first group 150(1). For example, a member of the first group 150(1) may provide information that is used to generate the response data 132. In one possible example, the member of the group 150(1) may access the user device 104(2) to write an article or to generate data to respond to the received query 106.

At 522 the response 110 based on the response data 132 is sent to the user device 104. For example, the response 110 may comprise directions that answer the received query 106. In some implementations, the response 110 may include user-selectable links, user-selectable feedback options, data, images, other information, or any combination thereof. In one possible example, user-selectable feedback options may include radio buttons; a sliding scale element; a text field; buttons (such as a "Yes, that article answered my question" button and a "No, that article did not answer my question" button); other user-selectable objects, images, or features; or any combination thereof. The user-selectable feedback options may be included in the response data 132, which can include a page that can be rendered within an Internet browser application and which can be selected by the user 102 to provide feedback 148. Other implementations are also possible.

At 524 the response data 132 is stored in the data repository 122. For example, the response data 132 may be used to generate data entries 124 that are stored in the data repository 122. In an example, the response module 134 may generate event data 136 including the response data 132, expert feedback data, and other data, which may be stored in the data repository 122.

At 526 at least a portion of the historical event data 146 is generated based on the first received query 106 and the response data 132. For example, the response data 132 may comprise information indicative of the group 150(1) that provided the response data 132 or is otherwise associated with responding to the first received query 106.

At 528 one or more of the models of the system 100 are trained using the event data 136. For example, the continuously trained model 304 (in FIG. 3) may be re-trained using event data 136 as the event data 136 is generated. In another example, the batch trained model 306 may use the historical event data 146 to generate a new or adjusted batch trained model 306.

Returning to 516, if the first confidence value is less than or equal to the first threshold, the method proceeds to 530. At 530 a determination is made, using an initial model 302 (in FIG. 3), of a selected group 150 that is associated with the first received query 106. The initial model 302 may be used to determine a match or correspondence value between terms associated with a canonical group and those terms presented in the first received query 106. For example, if the first received query 106 includes the word "FAX" and one of the terms associated with the canonical group is "FAX" which is associated with the canonical group 150(1) of "information technology", the first received query 106 may be associated with the canonical group "information technology" (Group 150(1)).

While the continuously trained model 304 and the batch trained model 306 may be specific to a particular organization or portion of an organization, the initial model 302 may be based at least in part on historical event data 146 from a plurality of organizations. The data used may be anonymized and confidential or sensitive information removed. For example, the historical event data 146 may be assessed and only those terms that exceed a threshold number of occurrences in more than a threshold number of organizations may be incorporated into the initial model 302.

In some implementations the initial model 302 may include the first relevancy scoring module 126, which may be used to generate a score that is indicative of a correspondence between the terms present in the first received query 106 and the terms associated with the canonical group 150. For example, the score may comprise a weighted sum of a count of terms in the first received query 106 that correspond to terms associated with the canonical group 150. The selected group 150 may be the canonical group with the greatest score that is associated with the first received query 106.

At 532, the first received query 106 is routed to the selected group 150. Continuing the example, if the selected group is "information technology" the system 100 may then proceed to send the first received query 106 to the members of that group 150(1) in the organization. The method may then proceed to 520.

Returning to 512, if the characteristic data is determined to be greater than the transition threshold, the method proceeds to 534. At 534 a determination is made, using a batch trained model 306 (in FIG. 3), of a second group 150 and of a second confidence value that is associated with the second group 150. For example, the batch trained model 306 may use a machine learning algorithm with a model that is periodically trained, such as every 24 hours using the historical event data 146. Alternatively, the batch trained model 306 may be trained initially, prior to deployment, and may remain static after deployment (such as the first relevancy scoring module 126). The batch trained model 306 may generate a set of possible groups 150, with a second confidence value for each group 150 in the set of possible groups 150. The second confidence value may be indicative of a likelihood that the associated group 150 is correctly determined.

The groups 150 in the set of possible groups 150 may be ranked by the second confidence value. The greatest ranking group 150 in the set of possible groups 150 may be designated as the second group 150. For example, the greatest ranking group 150(1) may be "information technology".

At 536 a determination is made as to whether the second confidence value is greater than a second threshold. If not, the method proceeds to 530 and the initial model 302 is used to determine the group 150 to which the received query 106 is to be routed. If the second confidence value is greater than the second threshold, the method proceeds to 538.

At 538 the first received query 106 is routed to the second group 150. Continuing the example, the first received query 106 may be sent to the members associated with the "information technology" group 150(1). The method may then proceed to 520.

As described above with respect to 512, the characteristic data may be compared to a transition threshold to determine whether to use the continuously trained model 304 or the batch trained model 306. In another implementation, the characteristic data may be representative of other parameters that may be used to determine when to transition between the continuously trained model 304 and the batch trained model 306.

These parameters may include N, k, minimum time, maximum time, force train time, other parameters, or any combination thereof. In this implementation N represents a total number of events in the historical event data 146 that are associated with the organization and available for training before transitioning from the continuously trained model to the batch trained model. For example, N may be set to a value of 300. In this example while the number of events in the historical event data 146 are less than N=300, the continuously trained model is used to process received queries 106.

Also in this implementation, the variable (k) may represent a total number of events in the historical event data 146 that are associated with the organization and available for training since a previous training of the batch trained model. For example, k becomes meaningful once more than N events suitable for training are present in the historical event data 146. Continuing the example, when N=300 as described above, a value of k=5 may be used. In this case, when number of event data 136 exceeds N, the system 100 may keep training the batch trained models 306 after every k number of events. This ensures that the batch trained model 306 is reflective of the most recent training events.

With this implementation, minimum time specifies a minimum time interval between consecutive training of the batch trained model 306 associated with the organization. Triggering training based only on events may result in training of the batch trained model 306 being initiated frequently, which increases the demand for compute resources. In one implementation, the minimum time may be specified. For example, a minimum time of 15 minutes may be used to provide a gap of at least 15 minutes between consecutive training. With an organization that is generating frequent events, this could result in a latency of approximately 30 minutes, assuming 15 minutes for the minimum time and 15 minutes to perform the training of the batch trained model.

In this implementation, the maximum time specifies a maximum time interval between consecutive training of the batch trained model 306 for the organization. In one implementation, the maximum time interval may be set to 2 hours. If at least one event takes place during that 2 hour maximum time interval, retraining of the batch trained model using the historical event data 146 would be initiated.

The implementation may also specify a force train time. The force train time specifies a time after which the batch trained model 306 is trained. For example, this may be used to force a retraining as needed to correct problems with the batch trained model 306. When used, if the time that the batch trained model 306 was last trained is greater than the force train time, training of the batch trained model 306 is triggered.

As described above, the transition between the use of the continuously trained model 304 and the batch trained model may be determined using characteristic data. This transition may be illustrated using a total number of events "n" in the historical event data 146 that are suitable for use in training, and with "k" indicating the number of queries in the historical event data 146 since the last training.

The following example illustrates the determination of when to transition between the continuously trained model 304 and the batch trained model 306. Given a fixed value of k of 5, and that the batch trained model 306 has trained on a first n events, the next training may be triggered when n+k queries are available in the historical event data 146. As described above, the continuously trained model 304 is trained using event data 136 for the received queries 106.

A comparison may be made between the continuously trained model 304 and the batch trained model 306. This comparison may consider the question "what is the probability that the batch trained model will make a routing mistake for any query between n+1 to n+k, which the continuously trained model would route correctly?". A related question is "what is the probability that an n+j'th query is routed correctly in the continuously trained model but would route incorrectly using the batch trained model for values of j in 1 . . . k?".

For the purpose of this example, assume that the received query 106 arrives randomly. The answer to the above question is approximately j−1/n. Consider that the chance that a n+j'th query has something in common with one of the queries from n+1 to n+j−1, but has nothing in common with queries from 1 to n. In this situation, the answer to the first question may be approximately expressed as:

$$P(n, k) = \sum_{j=1}^{k} (j-1)/n = k(k-1)/2n \qquad \text{(Equation 14)}$$

In equation 14, the function P represents a probability function for a query q between query n and query k, which represents the sum from 1 to k of the n+j'th query being wrong. By using Equation 14, it is possible to determine a proposed value of n given a specified value of P(n,k). For example, given a specification to have P(n, k) less than a pre-determined fraction x, the equation may be reduced to n=k(k−1)/2x. Continuing the example, if k=5 and x=0.033, then n≈300. In another example, if k=3, and x=0.01, then n=300.

By using the method described above, the system 100 is able to quickly begin processing queries 106 and effectively route those queries 106 to appropriate groups 150 for response. The initial model 302 dominates during early usage, and as more event data 136 is collected, the training of the continuously trained model improves and handles more of the queries 106. As the system 100 reaches the transition threshold, the group routing module 130 transitions to using the batch trained model 306, allowing for seamless growth without service interruption to the organization. As the batch trained model 306 continues to be trained using historical event data 146 that includes recent event data 136, the batch trained model 306 may continue to improve in accuracy and adjust for changes within the organization.

Figure 6:
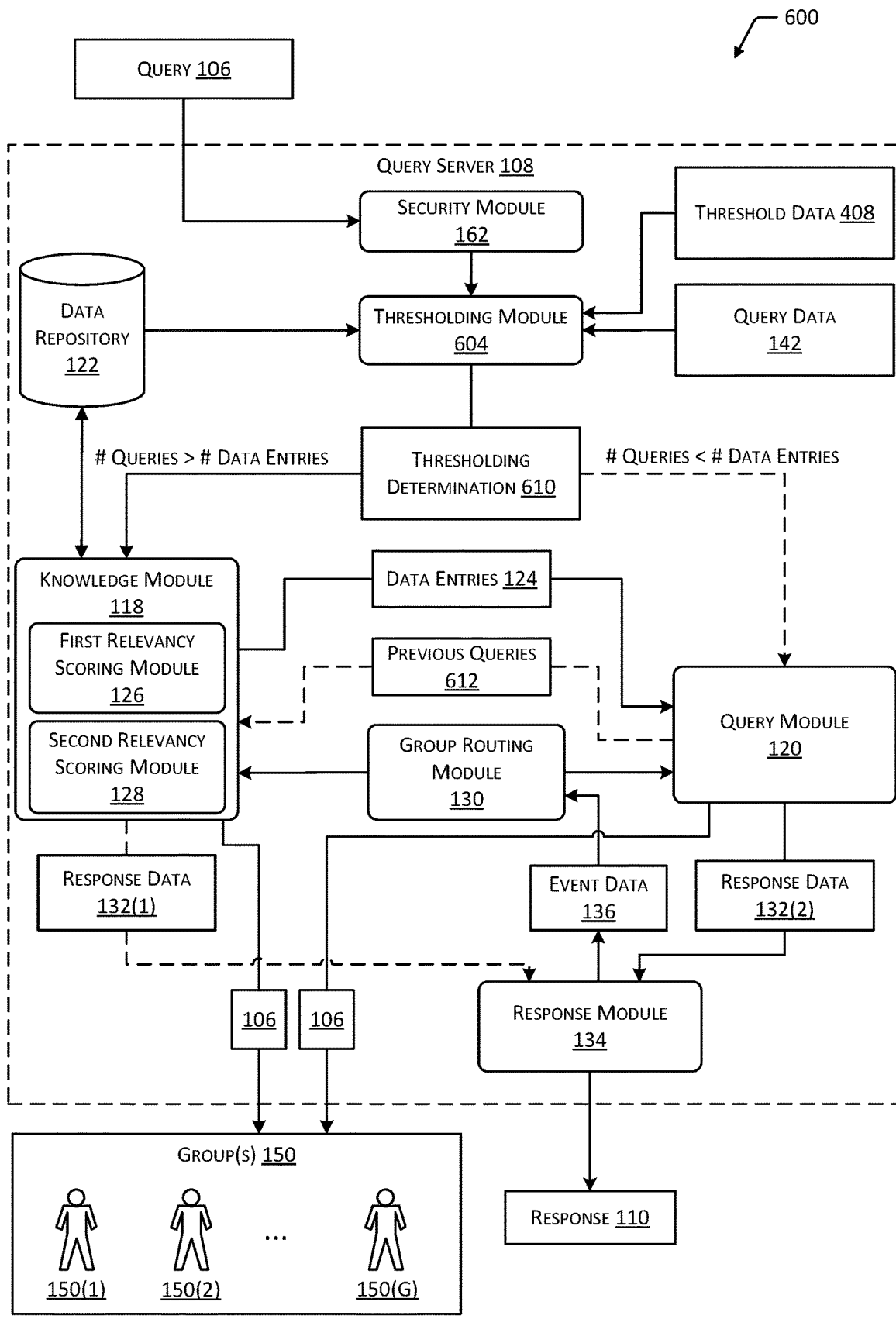
FIG. 6 depicts a system for determining a manner in which a response to a previous query may be routed and generated, according to one implementation.

FIG. 6 depicts a system 600 for determining a manner in which a response 110 to a received query 106 may be generated, according to one implementation. As described with regard to FIGS. 1A and 1B, a query may be provided from a user device 104 to a query server 108, which may process the received query 106 to generate a response 110. As also described above, a security module 162 may be used to determine which data repository 122 or portions thereof, if any, the user 102 is permitted access to.

In some implementations, a thresholding module 604 associated with the query server 108 may determine the manner in which the received query 106 is processed. For example, the thresholding module 604 may determine a current quantity of data entries 124 within a data repository 122 that may be analyzed for correspondence to the received query 106. The thresholding module 604 may also determine, based on query data 142, a current quantity of previous queries 612 associated with the data entries 124. As discussed above, if the number of existing data entries 124 exceeds the number of previous queries 612, it may be more efficient to first determine correspondence between the received query 106 and the smaller number of previous queries 612 to determine a subset of previous queries 612 that correspond to the received query 106. Then, correspondence between the received query 106 and the data entries 124 associated with the subset of previous queries 612 may be determined. If the number of previous queries 612 exceeds the number of data entries 124, it may be more efficient to first determine correspondence between the received query 106 and the data entries 124 to determine a subset of data entries 124 that correspond to the received query 106. Then, correspondence between the received query 106 and the previous queries 612 associated with the subset of data entries 124 may be determined. In other implementations, an efficiency value associated with processing of the data entries 124 or previous queries 612 may be determined in place of or in addition to determining a number of data entries 124 or previous queries 612. For example, based on the size or format associated with one or more data entries 124, determining correspondence between the data entries 124 and a received query 106 may be more efficient than determining correspondence between the received query 106 and previous queries 612, independent of the number of data entries 124 or previous queries 612.

The thresholding module 604 may generate a thresholding determination 610, indicative of whether the received query 106 will first be processed by the knowledge module 118 or the query module 120. As described with regard to FIG. 1, the knowledge module 118 may determine correspondence between the received query 106 and the data entries 124 within the data repository 122. The query module 120 may determine correspondence between the received query 106 and the previous queries 612 of the query data 142. In some implementations, the thresholding module 604 may generate the thresholding determination 610 based at least in part on threshold data 608. The threshold data 608 may indicate one or more relationships between the data entries 124 and the previous queries 612 that may determine the manner in which a received query 106 may be processed with the greatest efficiency. For example, in some cases, due to the size or format of at least a portion of the data entries 124, determining correspondence between a received query 106 and a large number of data entries 124 may be accomplished more quickly than determining correspondence between a received query 106 and a smaller number of previous queries 612. The threshold data 608 may indicate the extent to which the number of data entries 124 may exceed the number of previous queries 612 before determining correspondence between the received query 106 and the previous queries 612 may be accomplished with greater efficiency that determining correspondence between the received query 106 and the data entries 124. In other cases, determining correspondence between the received query 106 and a large number of previous queries 612 may be accomplished more quickly than determining correspondence between the received query 106 and a smaller number of data entries 124. In some implementations, the threshold data 608 may include one or more user-selected or default values. In other implementations, the threshold data 608 may be automatically or dynamically modified as additional data entries 124 and previous queries 612 are stored, based on the characteristics of each data entry 124 and previous query 612.

In cases where correspondence between a received query 106 and the data entries 124 may be determined more efficiently than correspondence between the received query 106 and the previous queries 612, the received query 106 may first be processed by the knowledge module 118. The knowledge module 118 may determine correspondence between the received query 106 and the data entries 124 in the data repository 122 to determine at least a subset of the data entries 124 that may be used to generate a response 110. The query module 120 may then determine the previous queries 612 that are associated with the subset of the data entries 124, and determine correspondence between those previous queries 612 and the received query 106. The correspondence values associated with the previous queries 612 and those associated with the data entries 124 may be used to identify the particular data entry 124 having the greatest total correspondence value, which may be included in a response 110 generated by the response module 134.

In cases where correspondence between a received query 106 and the previous queries 612 may be determined more efficiently than correspondence between the received query 106 and the data entries 124, the received query 106 may first be processed by the query module 120. The query module 120 may determine correspondence between parameters of the received query 106 and parameters of one or more previous queries 612 received by the query server 108. The knowledge module 118 may then determine the particular data entries 124 that correspond to the previous queries 612 identified by the query module 120. Based on correspondence between the received query 106 and the particular data entries 124 and between the received query 106 and the previous queries 612, a responsive data entry 124 having the greatest correspondence value may be determined. The response module 134 may generate a response 110 based on the responsive data entry 124.

If the system 100 is unable to determine the response data 132 or determine response data 132 that exhibits a correspondence that exceeds a threshold value, the group routing module 130 may be used to determine which group 150 the received query 106 is to be directed to for resolution. The received query 106 may then be routed to the group 150. Subsequently, one or more of the event data 136 or the historical event data 146 may be used to train one or more of the continuously trained model 304 or the batch trained model 306.

Figure 7:
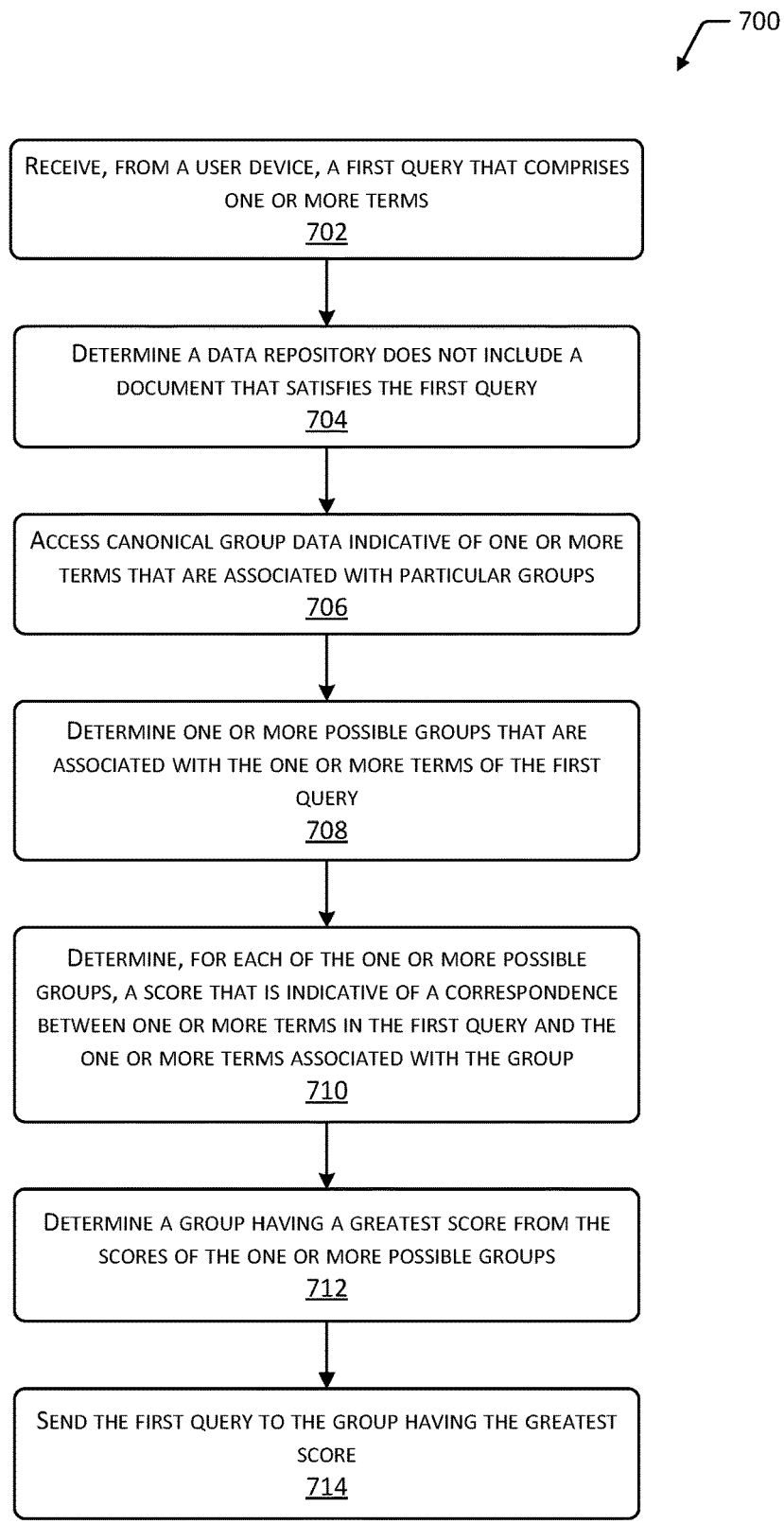
FIG. 7 is a flow diagram illustrating a method of using a group routing model to select a group, according to one implementation.

FIG. 7 is a flow diagram 700 illustrating a method of using an initial model 302 to select a group 150, according to one implementation. The method may be implemented at least in part by the group routing module 130.

At 702 a first received query 106 including one or more terms is received from a user device 104. The received query 106 may include various parameters, such as keywords, groups of words, arrangements of words, formats of words or letters, punctuation, and so forth.

At 704 the system 100 determines that the data repository 122 does not include a document or article that satisfies the first received query 106. In an example, the knowledge module 118 may be unable to identify a document or article that satisfies the received query 106. For example, the knowledge module 118 may determine that no article exists that matches the received query 106. Alternatively, the knowledge module 118 may determine that one or more articles exist, but that the total relevancy score for one or more of such articles is below a threshold value.

At 706 canonical group data is accessed. The canonical group data is indicative of one or more canonical groups and terms associated with those canonical groups. The canonical group data is discussed in more detail below with regard to FIG. 3.

At 708 a set of possible groups 150 comprising the particular groups 150 that are associated with one or more terms of the first received query 106 is determined. For example, the terms present in the first received query 106 may be compared with the terms associated with the canonical groups 150. Those groups 150 in the canonical group data that have at least a partial match to the terms present in the received query 106 may be included in the set of possible groups 150. For example, the group data may include terms and other data that may be used to identify the group 150 from terms of the received query 106. Those groups 150 in the canonical group data that exhibit no match between the terms present in the received query 106 and the terms associated with the canonical group 150 may be disregarded or otherwise omitted from the set of possible groups 150.

At 710 a score is determined for each group 150 in the set of possible groups 150. The score may be indicative of a correspondence between one or more terms in the first received query 106 and the one or more terms associated with the group 150. For example, a correspondence value may be determined that indicates an extent to which a match or partial match exists between one or more of the terms in the first received query 106 and one or more of the terms that are associated with the canonical groups 150. The correspondence value may be determined based on a weighted sum of the count of terms in the first received query 106 that correspond to terms in the particular canonical group 150. Other implementations are also possible.

At 712 a group from the set of possible groups 150 is selected as a selected group 150. In one implementation, the selected group 150 may be the canonical group that has a greatest score and exceeds a threshold score. For example, to be deemed a selected group 150, a minimum score threshold may be a value of 17. If the greatest score in the set of possible groups 150 is 18, then the group 150 associated with that score will be designated as the selected group 150. However, if the greatest score is not greater than the minimum score threshold, the first received query 106 may be directed to a default group 150.

At 714 the first query may be sent to the group 150 having the greatest score. In an example, if the query terms include a question related to vacation days, the query may be sent to one or more users 102 of a human resources group 150(2). Other implementations are also possible.

Figure 8:
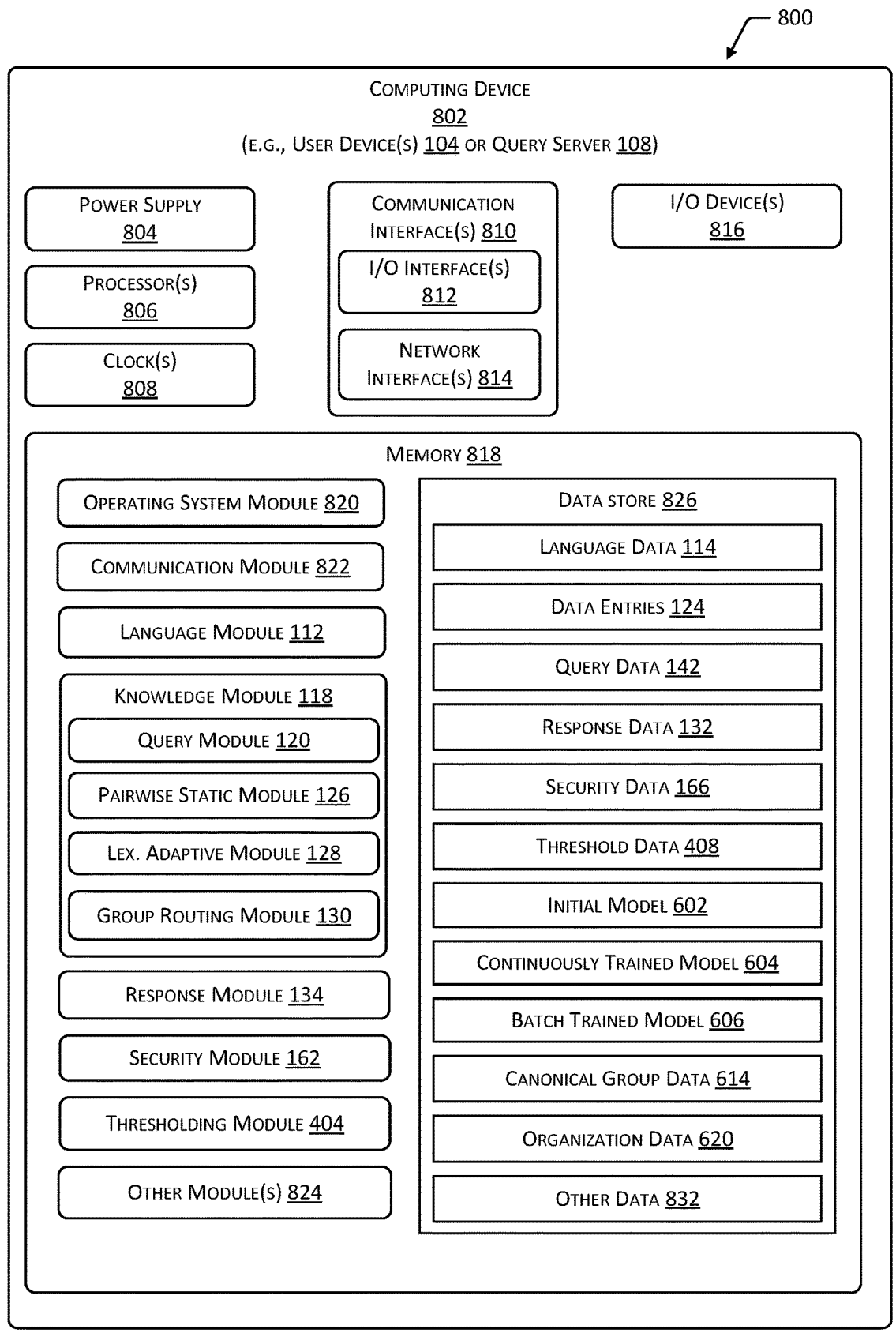
FIG. 8 is a block diagram depicting a computing device that provides for dynamic query routing, according to one implementation.

FIG. 8 is a block diagram 800 depicting a computing device 802 within the scope of the present disclosure. The computing device 802 may include, without limitation, one or more servers, personal computers, smartphones or other mobile devices, set-top boxes, tablet computers, wearable computers, automotive computers, and so forth. For example, the computing device 802 may include a query server 108, such as the query server 108 described with regard to FIGS. 1A, 1B, and 7. Additionally, while FIG. 8 depicts a single example computing device 802, in some implementations, computing functions described within the scope of the present disclosure may be performed by multiple computing devices 802, such as a distributed network of query servers 108 or other computing devices 802 in communication therewith. For example, a first computing device 802 may store one or more modules that may act upon data stored in a second computing device 802.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interface(s) 810, such as input/output (I/O) interface(s) 812, network interface(s) 814, and so forth. The communication interfaces 810 may enable the computing device 802, or components of the computing device 802, to communicate with other computing devices 802 or components thereof. The I/O interface(s) 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O device(s) 816. The I/O devices 816 may include any manner of input device or output device associated with the computing device 802 or with another computing device 802 in communication therewith. For example, I/O devices 816 may include touch sensors, keyboards, mouse devices, microphones, image sensors (e.g., cameras), scanners, displays, speakers, lights, haptic devices, printers, motion sensors, location sensors, and so forth. In some implementations, the I/O device(s) 816 may be physically incorporated with the computing device 802 or may be externally placed.

The network interface(s) 814 may be configured to provide communications between the computing device 802 and other devices, such as the I/O devices 816, routers, access points, user devices 104, other computing devices 802, and so forth. The network interface(s) 814 may include devices configured to couple to one or more networks, including local area networks (LANs), wireless LANs, wide area networks (WANs), wireless WANs, and so forth. For example, the network interfaces 814 may include computing devices 802 compatible with Ethernet, Wi-Fi, Wi-Fi Direct, Bluetooth, Bluetooth Low Energy, ZigBee, Z-Wave, 3G, 4G, 5G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 826 and one or more of the following modules may also be stored in the memory 818. The modules may be executed as foreground applications, background tasks, daemons, and so forth. The data store 826 may use a flat file, database, linked list, tree, executable code, script, or other data structure to store information. In some implementations, the data store 826 or a portion of the data store 826 may be distributed across one or more other devices including other computing devices 802, network attached storage devices, and so forth.

A communication module 822 stored in the memory 818 may be configured to establish communications with user devices 104, query servers 108, or other computing devices 802. For example, the communication module 822 may be configured to receive queries 106 from user devices 104 or other computing devices 802 and to provide responses 110 or other data to other computing devices 802.

The memory 818 may store a language module 112. The language module 112 may be configured to determine parameters of a received query 106. For example, a received query 106 may include one or more of alphanumeric data, video data, audio data, image data, or other types of data. The language module 112 may determine the types of data within the received query 106 and particular parameters associated with one or more types of data. For example, the language module 112 may determine particular words within a received query 106, such as by determining correspondence between alphanumeric data in the received query 106 and language data 114, which in some implementations may include dictionary data indicative of words of one or more natural languages. As another example, the language module 112 may include an optical character recognition (OCR) module configured to recognize text embedded within image data, an image recognition module configured to recognize characteristics of images, and so forth. As yet another example, the language module 112 may include a speech recognition, speech-to-text, or text-to-speech module configured to determine words present in audio data.

Based on the language data 114, the language module 112 may determine a weight value associated with one or more of the parameters determined in the received query 106. For example, the language data 114 may associate particular query parameters with corresponding weight values. Continuing the example, words within a received query 106 that are not indicative of the purpose of the received query 106 and may commonly occur in many queries may have a weight value of zero or a low weight value. Words that are indicative of the purpose of the received query 106 and do not commonly occur within other queries may have a high weight value. In some implementations, the language module 112 may be configured to remove one or more parameters from the received query 106 when generating an augmented query 116. For example, query parameters having a weight value of zero or a weight value less than a threshold weight value may be removed from the received query 106 to generate the augmented query 116. In some implementations, parameters that lack an associated weight value may be assigned a default weight value. In other implementations, parameters that lack an associated weight value may be disregarded.

In some implementations, the language data 114 may also associate one or more synonyms with particular query parameters. In such cases, the language module 112 may add one or more synonyms to the received query 106 to generate the augmented query 116. The augmented query 116 may include an indication of the weight value of each parameter. In some implementations, a synonym may have a weight value equal to the weight value of the query parameter for which the synonym was determined. In other implementations, a synonym may be associated with a different weight value than that of the query parameter for which the synonym was determined.

The memory 818 may also store the knowledge module 118. The knowledge module 118 may be configured to determine correspondence between a received query 106 or an augmented query 116 and one or more data entries 124. For example, the augmented query 116 may include one or more parameters, such as the query parameters determined by the language module 112 and the parameters added to the received query 106 by the language module 112 to generate the augmented query 116. Each data entry 124 may also include one or more parameters. For example, a data entry 124 may include one or more of alphanumeric data, audio data, video data, image data, and so forth. Continuing the example, the data entry 124 may include one or more words or groups of words, one or more grammatical elements or arrangements of words, or other parameters that are included in the augmented query 116. Each parameter common between the data entry 124 and the augmented query 116 may have an associated weight value, indicated in the language data 114. In some implementations, the knowledge module 118 may determine a correspondence value for each data entry 124 based on the common parameters for each data entry 124 that are shared with the augmented query 116, and the weight value for each parameter.

In some implementations, the knowledge module 118 may be configured to determine a subset of the data entries 124. The subset of data entries 124 may include all data entries 124 having a correspondence value greater than a threshold correspondence value. In other implementations, the knowledge module 118 may be configured to determine a selected quantity of data entries 124, such as the forty data entries 124 having the greatest forty correspondence values. In still other implementations, the subset of data entries 124 may be determined using a combination of threshold correspondence values. For example, the knowledge module 118 may determine the twenty data entries 124 having the greatest correspondence values, as long as each correspondence value exceeds a threshold correspondence value. In cases, where twenty of the data entries 124 do not have correspondence values that exceed the threshold correspondence value, only the data entries 124 having a correspondence value in excess of the threshold correspondence value may be included in the subset.

The knowledge module 118 may include the query module 120. The query module 120 may be configured to determine, based on query data 142, the correspondence values for previous queries 612 received by the computing device 802 that are associated with the subset of data entries 124 determined by the knowledge module 118. For example, the query data 142 may associate particular previous queries 612 with particular data entries 124. The query module 120 may also determine correspondence between previous queries 612 and the augmented query 116. For example, each previous query 612 may include one or more parameters, such as words, grammatical structures, formats, images, audio data, and so forth. A particular previous query 612 may have one or more parameters in common with the augmented query 116. Based on the weight value for each common parameter, as indicated in the language data 114, a correspondence value for the previous query 612 may be determined.

The knowledge module 118 may also include the first relevancy scoring module 126, which may be trained using pre-labeled data, or which may be trained from an existing dataset including historical event data 146. The first relevancy scoring module 126 may be configured to determine first relevancy scores for one or more of the set of search results.

The knowledge module 118 may further include the second relevancy scoring module 128, which may determine second relevancy scores for one or more of the set of search results. The second relevancy scoring module 128 may be adjusted based on feedback 148, historical event data 146, event data 136, or any combination thereof. In some implementations, the second relevancy scoring module 128 may be configured to learn-to-rank in real-time and on-line, based on the feedback 148, in order to continuously improve the response of the knowledge module 118.

The knowledge module 118 may combine the first relevancy score and the second relevancy score to determine a total relevancy score for one or more of the search results. Further, the knowledge module 118 may select a result (article or document) having a greatest total relevancy score as the data entry 124 to be provided as part of the response data 132.

If the knowledge module 118 is unable to determine a data entry 124 that corresponds to the received query 106 or augmented query 116, or if the greatest total relevancy score for the results is below a threshold level, the knowledge module 118 may provide the received query 106 to the group routing module 130, which may use one or more of the initial model 302, the batch trained model 306, and the continuously trained model 304 to determine a group 150 to which the received query 106 is to be routed.

The memory 818 may additionally store the response module 134. The response module 134 may generate a response 110 based on the particular data entry 124 and response data 132, which may be determined from the data repository 122 or which may be provided by a member of the determined group 150. The response data 132 may include alphanumeric data, audio data, video data, image data, or other data that may be included in the response 110, one or more formats or arrangements of data, and so forth. For example, the response data 132 may include one or more fonts, templates, styles, and so forth that may be applied to the text of the particular data entry 124. As another example, the response data 132 may include instructional text to be provided in association with a hyperlink that may be used to access the particular data entry 124. In some implementations, different response data 132 may be associated with different data entries 124. For example, a response 110 associated with a first data entry 124 may include the full text of that data entry 124, presented in a particular font and arrangement indicated in the response data 132. A response 110 associated with a second data entry 124 may include instructional text and a hyperlink used to access the second data entry 124.

The memory 818 may further store the security module 162. The security module 162 may determine correspondence between user data 164, determined from a received query 106, and security data 166, to determine whether a particular user device 104 is authorized to access a data repository 122 or data entry 124. For example, security data 166 may associate sources of queries 106 with sources of data entries 124. A source of the received query 106 may be determined based on the user data 164. For example, the user data 164 may include an IP address or other network address or identifier, a username and password, other authentication data, or any combination thereof. The security data 166 may associate various network addresses or identifiers with corresponding sources of queries, such as user accounts, usernames or identifiers, user companies, and so forth. As such, the security data 166 may indicate particular sources of queries, such as user devices 104 or user accounts, that are authorized to access particular data entries 124 or particular sources of data entries 124. Based on correspondence between the user data 164 and the security data 166, the security module 162 may determine whether a user device 104 is authorized to access a specific data entry 124 or data repository 122 and either cause the user device 104 to be provided with access or prevent access by the user device 104. In some implementations, the security module 162 may generate one or more notifications indicative of a successful or unsuccessful attempt to access a particular data entry 124 or data repository 122. In some cases, notifications may be provided to an administrator associated with the computing device 802. In other cases, notifications may be provided to the user device 104 submitting the query. In some implementations, based on a lack of correspondence between the user data 164 and security data 166, the security module 162 may generate a response 110 to a received query 106 that indicates one or more of a lack of authorization to access applicable data sources, alternate means for resolving the received query 106, contact information for individuals or groups of individuals that may assist with resolving the received query 106 or obtaining access to the data sources, and so forth. The particular content of such a response 110 may be determined based in part on the particular data entry 124 or data repository 122 associated with the received query 106, the response data 132, and the security data 166.

The memory 818 may also store the thresholding module 604. The thresholding module 604 may determine the quantity and characteristics (e.g., data size, data types, formats) of the data entries 124 and previous queries 612 (query data 142) stored in the data store 826. Based on the quantity and characteristics of the data entries 124 and query data 142, the thresholding module 604 may determine a first efficiency value indicative of the time or resources that may be used to determine correspondence between a received query 106 and the data entries 124, and a second efficiency value indicative of the time or resources that may be used to determine correspondence between the received query 106 and the query data 142. The efficiency values may include a length of time that may be used to process a received query 106, a quantity of computing resources, such as processor cycles, that may be used to process the received query 106, a quantity of external resources, such as electrical power, that may be used to process the received query 106, and so forth. The manner in which the efficiency values are calculated may be determined based on one or more rules or algorithms indicated by threshold data 608. Based on the quantity and characteristics of the data entries 124 and previous queries 612 in the query data 142, the thresholding module 604 may generate a thresholding determination 610 indicating whether a received query 106 is first analyzed by determining correspondence between the received query 106 and the data entries 124, or by determining correspondence between the received query 106 and the previous queries 612 (of query data 142). The threshold data 608 may include data indicative of relationships between the previous queries 612 and data entries 124 or between the first and second efficiency values that may determine whether initially analyzing a received query 106 using the data entries 124 or the previous queries 612 would consume less time or resources.

Other modules 824 may also be present in the memory 818. For example, encryption modules may be used to encrypt and decrypt communications between computing devices 802. User account modules may be configured to receive and process user data 164. Administrator modules may be used to modify default settings and preferences. Machine learning modules may be configured to determine relationships between queries 106 and data entries 124 and between query parameters and language data 114. User interface modules may be used to provide user interfaces that may receive queries, user data 164, feedback data, and so forth. Feedback modules may receive feedback data 140 and determine correspondence between the feedback data 140 and a threshold feedback value, which may in turn determine whether a received query 106 is stored as additional query data 142.

Other data 832 within the data store 826 may include default configurations and settings associated with computing devices 802. Other data 832 may also include security data, such as encryption keys and schema, access credentials, and so forth. Other data 832 may further include user interface content and formats, algorithms used to process and analyze feedback data 140, and so forth.

In different implementations, different computing devices 802 may have different capabilities or capacities. For example, query servers 108 may have significantly more processor 806 capability and memory 818 capacity compared to the processor 806 capability and memory 818 capacity of user devices 104. Other implementations are also possible.

Figure 9:
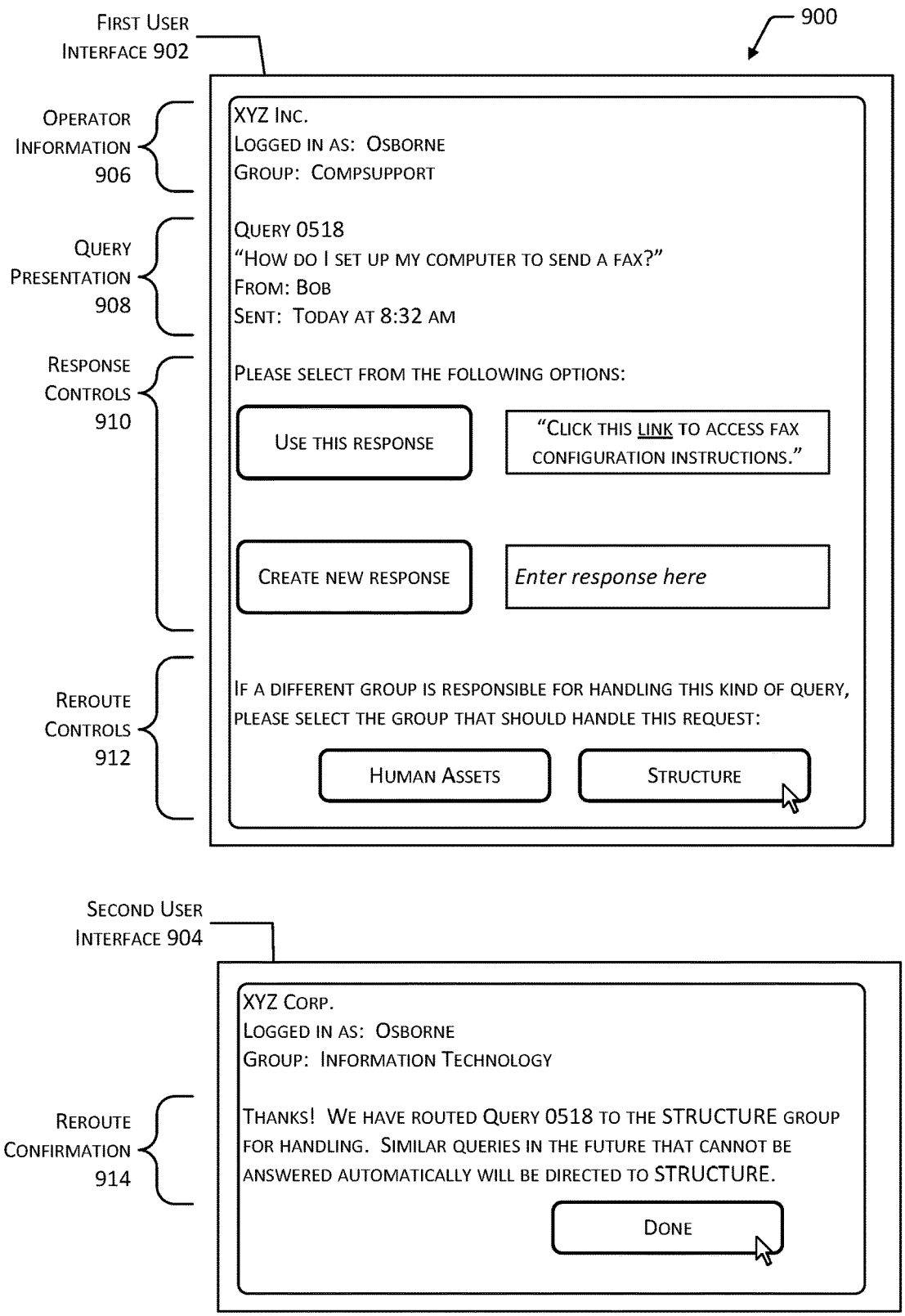
FIG. 9 depicts user interfaces that may be provided to group members to respond to or re-route a query, according to one implementation.

FIG. 9 depicts user interfaces 900 that may be provided to group members 324 to respond to or re-route a received query 106, according to one implementation. For example, the user interfaces 900 may be presented on user devices 104 that are utilized by the group members 324.

A first user interface 902 presents contains information about a received query 106 that has been routed to a user device 104 of a group member 324. An operator information 906 section includes information such as the name of the organization (XYZ Inc.), login credentials of the group member 324, and the group 150 of the group member 324 processing queries 106. For example, in some situations a single person may be a member of two or more groups 150. Continuing the example, the person may select the group 150 for which he or she is handling queries 106.

The first user interface 902 includes a query presentation 908 portion that provides information about the particular received query 106. For example, the received query 106 is the text "How do I set up my computer to send a fax?". Information about the user 102 may be included in some implementations. For example, we see here that the received query 106 is from "Bob" and was sent today.

The first user interface 902 includes response controls 910. The response controls 910 allow the group member 324 to take various actions with respect to the received query 106. For example, the system 100 may have determined a possible response 110, but that response 110 may have had a confidence value or other metric that was below a threshold value and thus was not sent automatically or otherwise required human intervention. The group member 324 may select the "use this response" control to provide a response 110 that is based on this possible response 110. The user interface 902 includes a response control 910 to "create new response" that allows the group member 324 to create a response 110 to the received query 106.

The first user interface 902 may include reroute controls 912. The reroute controls 912 allow the group member 324 to direct the received query 106 to a different group 150. For example, in some situations the group routing module 130 may incorrectly route a received query 106. The reroute controls 912 allow the group member 324 to manually select another group 150. In some implementations the groups 150 may be listed in a predetermined order or may be ranked based on probability or confidence values associated with those groups 150 for the particular received query 106.

A second user interface 904 shows the user interface after selection of the reroute control 912 to direct the received query 106 to the "STRUCTURE" group 150. The second user interface 904 presents a reroute confirmation 914 that indicates that the query has been rerouted to the "STRUCTURE" group 150.

Once the group member 324 has completed reviewing the second user interface 904, the group member may utilize the user device 104 to proceed to a third user interface (not shown) that presents another received query 106.

Figure 10:
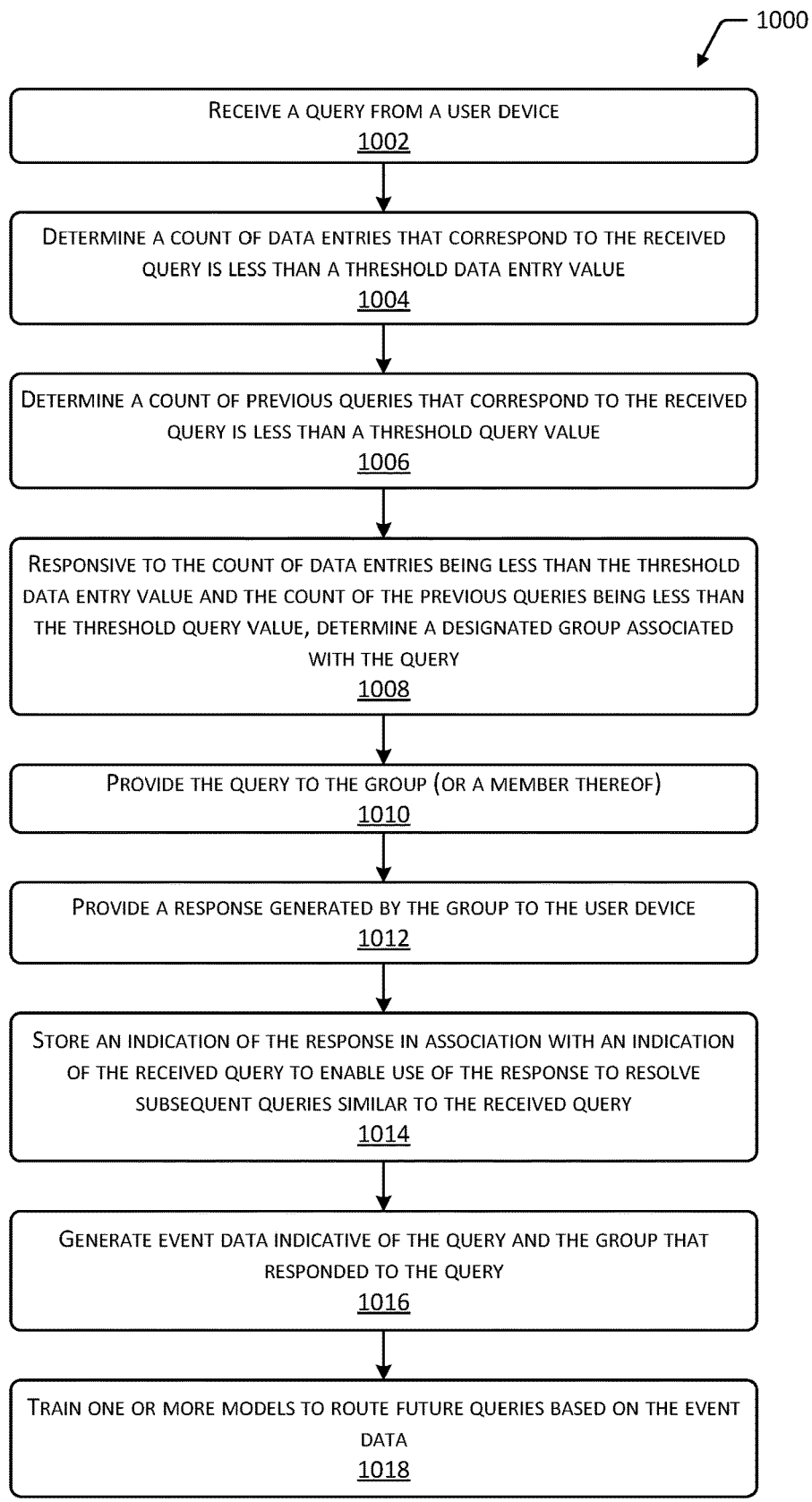
FIG. 10 is a flow diagram illustrating a method for routing a query to one or more human users in a particular group, according to one implementation.

FIG. 10 is a flow diagram 1000 illustrating a method for routing a received query 106 to one or more human users 102 in a particular group 150, according to one implementation. The method may be implemented at least in part by the query server 108.

At 1002 a query 106 is received from a user device 104. The received query 106 may include various parameters, such as keywords, groups of words, arrangements of words, formats of words or letters, punctuation, and so forth. In some implementations, the query 106 may include a natural language input.

At 1004 a count of data entries 124 that correspond to the received query 106 is determined that is less than a threshold data entry value. For example, the count of the data entries that correspond to a particular received query 106 may be zero. Such a count is below the threshold data entry value. In some situations, the data repository 122 may not yet be completed, and the article or data may need to be created. In other implementations, the system may identify one or more data entries 124 within the data repository 122, but the total relevancy score for the one or more data entries 124 may be below a relevance threshold.

At 1006 a count of previous queries 612 that correspond to the received query 106 is determined that is less than a threshold query value. Continuing the example, in some cases, for a particular received query 106, no existing previous query 612 may include parameters that correspond to those of the received query 106 within a threshold level of confidence. In one example the system may have just been activated and the received query 106 may be one of the first queries 106 received.

Responsive to the count of the data entries 124 being less than the threshold data entry value and the count of the previous queries 612 being less than the threshold query value, at 1008 a designated group 308 is determined that is associated with the received query 106. In some implementations, the group routing module 130 may utilize an initial model 302, a continuously trained model 304, or a batch trained model 306 to determine a group 150 to which the received query 106 should be routed.

At 1010 the received query 106 is provided to the designated group 308, or a group member 324 of that group 150. In some implementations, the received query 106, the augmented query 116, the identified data entries 124 (if any), other data, or any combination thereof may be provided to the user device 104 associated with the designated group member 324.

At 1012 the response 110 generated by the group member 324 is provided to the user device 104. In some cases, the response 110 may include a data entry 124 generated by the group member 324, the data entry 124 including information responsive to the received query 106. The data entry 124 (response data 154) may be provided to the knowledge module 118 and optionally to the data repository 122. Further, the second relevancy scoring module 128 may be adjusted to reflect the change so that subsequent queries 106 directed at similar subject matter may surface the response data 154. Other implementations are also possible.

At 1014 an indication of the response 110 that is associated with an indication of the received query 106 is stored, to enable the response 110 to be used to resolve subsequent queries similar to the received query 106. For example, if a subsequent query having similar parameters is received, a data entry 124 generated by the user(s) 102 may be used to form the response 110 in place of or in addition to providing the received query 106 to the corresponding group 150 of users 102.

At 1016 event data 136 is generated that is representative of the received query 106 and the group 150 that responded to the received query 106. The event data 136 may include the received query 106, the augmented query 116, data corresponding to the group 150, and the response data 154. Other implementations are also possible.

At 1018 one or more models are trained to route future queries 106 based at least in part on the event data 136. For example, as described above, the continuously trained system 608 or the batch trained system 606 may be trained using the event data 136 or historical event data 146, respectively. Subsequent queries 106 having the term "company policy" would then be routed to the appropriate group 150, independent of whether the queries 106 include the terms "computer" and "configure".

Figure 11:
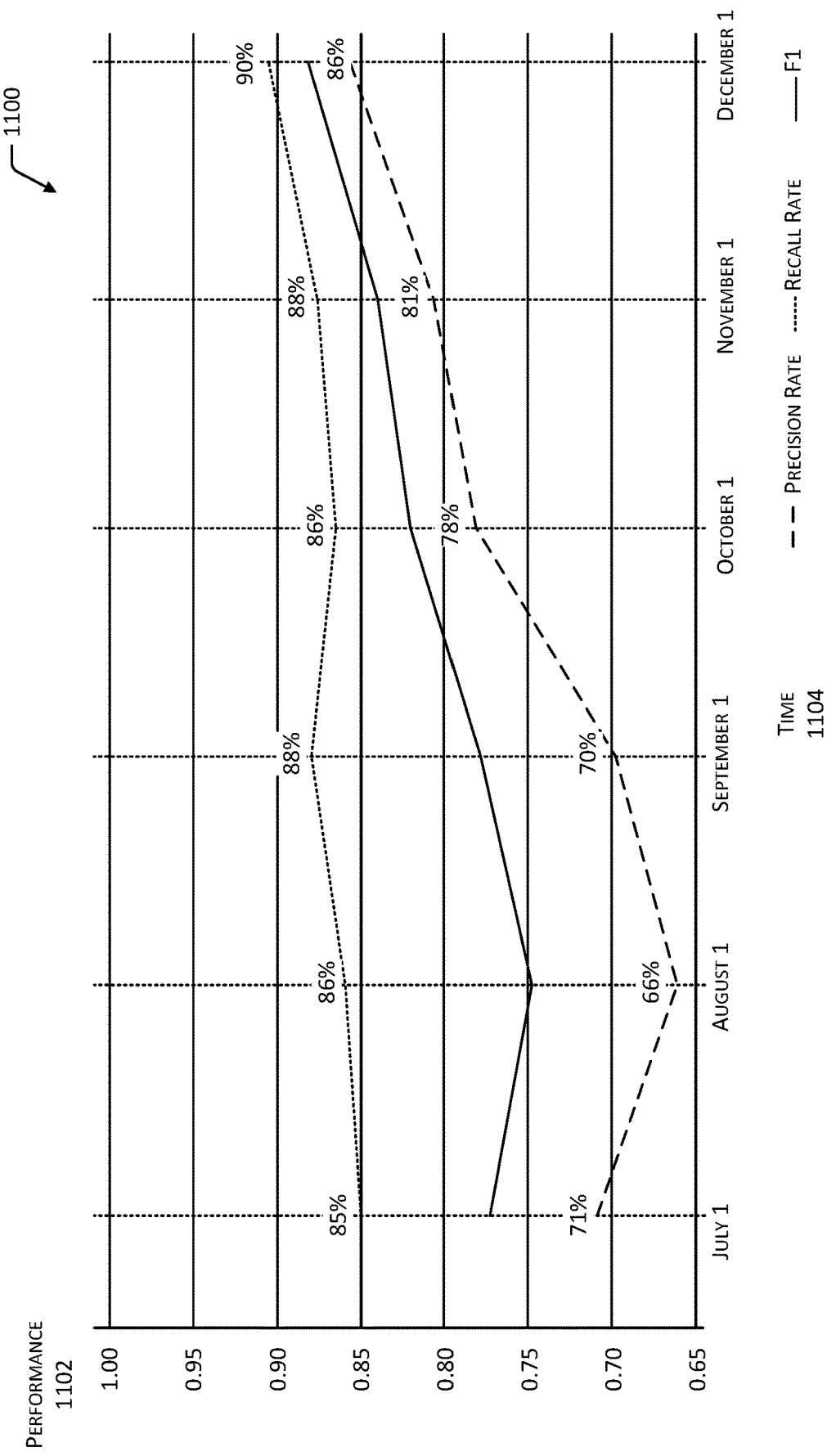
FIG. 11 depicts a graph of performance (precision, recall, and F1) over time of a knowledge module of the system of FIG. 1, according to one possible implementation.

FIG. 11 depicts a graph 1100 of performance 1102 (precision, recall, and F1) over time 1104 for a knowledge module 118 of the system 100 of FIGS. 1A and 1B, according to one possible implementation. The graph 1100 depicts a deployment of the system 100 over time 1104. In this example, the performance was measured using precision and recall based on user actions according to the following equations:

$$\text{Precision} = \frac{\text{\# Queries where user accepts the proposed } KB \text{ article}}{\text{\# Queries where the system proposes a } KB \text{ article}} \quad \text{(Equation 15)}$$

$$Recall = \frac{\text{\# Queries where user accepts the proposed } \mathit{KB} \text{ article}}{\text{\# Queries answered by a preexisting } \mathit{KB} \text{ article}} \quad \text{(Equation 16)}$$

$$F1 = \frac{2 \text{ Precision Recall}}{\text{Precision} + \text{Recall}} \quad \text{(Equation 17)}$$

In Equations 15 and 16, queries 106 answered by a pre-existing knowledge base article are defined as those queries 106 where the system 100 correctly answers with a knowledge base article or an expert answer using a knowledge base article that existed at the time of the received query 106 being asked. This precludes articles that were answered by knowledge base articles that were created after the received query 106 was asked (and that was then created by a member of one of the groups 150).

As demonstrated in the graph 1100, since the knowledge module 118 (and particularly the second relevancy scoring module 128) is continuously learning from feedback 148, the quality metrics improve with more feedback 148. In the graph 1100, data was selected from a set of 10 random client data repositories 122 and the metrics were monitored.

As can be seen in the graph 1100, the performance 1102 improved from 0.77 F1 to 0.88 F1 over six months. The steady rise in the value of F1 is attributed to the second relevancy scoring module 128 learning from feedback 148. Thus, as can be seen in the graph 1100, performance 1102 of the system 100 continually and reliably improves over time with feedback 148.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method of responding to queries of users within an organization for knowledge base articles of the organization, the computer-implemented method comprising:

receiving a query at a query server from a user device of the organization;

determining a set of search results from a data repository of the query server based on the query;

determining first relevancy scores for the set of search results based on matches between terms of the query and terms of the set of search results using a first relevancy algorithm including a first plurality of coefficients;

determining second relevancy scores for the set of search results based on matches between the terms of the query and lexical features associated with the search results of the set of search results using a second relevancy algorithm including a second plurality of coefficients, each of the search results of the set of search results including one or more lexical features of the set of search results;

determining total relevancy scores for one or more search results in the set of search results based on the first relevancy scores and the second relevancy scores;

determining a search result of the one or more search results of the set of search results having a highest total relevancy score;

selecting, from a plurality of groups of users associated with the organization and based on determining that the highest total relevancy score associated with the determined search result is less than a threshold value, a first group of users, wherein the first group of users is associated with a confidence value that satisfies a confidence threshold, and wherein the confidence value indicates a likelihood that the first group of users is tasked with responding to queries related to the query;

identifying one or more users that are members of the first group of users;

providing the query to the identified one or more users of the first group of users;

receiving, from one of the one or more users of the first group of users, response data for a response to the query;

storing the received response data for the response to the query in the data repository; and providing a knowledge base article including the received response data to the user device.

2. The method of claim 1, further comprising:

receiving first feedback data from the user device;

determining the first feedback data is positive;

modifying a first coefficient of the second plurality of coefficients without modifying a second coefficient of the second plurality of coefficients;

receiving second feedback data from the user device;

determining the second feedback data is negative; and modifying the second coefficient of the second plurality of coefficients without modifying the first coefficient of the second plurality of coefficients.

3. The method of claim 1, further comprising:

determining one or more of the first plurality of coefficients using a training data set before receiving the query; and determining one or more of the second plurality of coefficients in response to feedback data received after providing the knowledge base article including the response data.

4. The method of claim 1, further comprising:

determining user data associated with the query;

determining access permissions based on the user data relative to security data indicative of authorized user accounts;

determining a user associated with the user data is not authorized to access information requested in the query based on the access permissions;

determining a second group of users, from the plurality of groups of users, based on the query; and sending the query and the authorization data to the second group of users.

5. The method of claim 1, further comprising:

receiving second feedback data from the user device;

determining the second feedback data corresponds to a feedback threshold; and modifying a first coefficient of the second set of coefficients without modifying a second coefficient of the second set of coefficients.

6. The method of claim 1, further comprising:

modifying the second set of coefficients such that the second relevancy algorithm increases monotonically with feedback data indicative of positive feedback; and limiting the total relevancy scores according to a predetermined limit value.

7. A system comprising:

a communications interface;

one or more memories storing a data repository and processor-executable instructions; and one or more hardware processors to execute the processor-executable instructions to:

receive a query from a device via the communications interface;

determine a set of search results from the data repository based on the query;

determine, using a first relevancy algorithm, first relevancy scores for one or more search results of the set of search results based on pairwise matches between terms related to the query and one or more terms within the set of search results, the first relevancy algorithm including a first set of coefficients;

determine, using a second relevancy algorithm, second relevancy scores for the one or more search results of the set of search results based on a correspondence between one or more of the terms of the received query and lexical features associated with the one or more search results of the set of search results, the one or more search results including one or more of the lexical features including information about the one or more search results, the second relevancy algorithm including a second set of coefficients;

determine total relevancy scores by aggregating the first relevancy scores with the second relevancy scores;

determine a search result having a greatest total relevancy score;

select, from a plurality of groups of users, based on a determination that the greatest total relevancy score is less than a first threshold value, based on the one or more terms within the query, and using a group routing module having a third set of coefficients, a first group of users within a particular department of an organization, wherein the first group of users is associated with a confidence value that satisfies a confidence threshold, and wherein the confidence value indicates a likelihood that the first group of users is tasked with responding to queries related to the query;

send the query to one or more members of the first group of users via the communications interface;

receive a data entry from one of the one or more members of the first group of users;

provide response data including the received data entry from the one or more members of the first group of users to the device;

receive feedback data based on the response data; and determine one or more of the second set of coefficients based on the feedback data.

8. The system of claim 7, wherein the one or more hardware processors further execute the processor-executable instructions to:

determine the feedback data related to the response data is negative;

determine, using the group routing module, a second group of users, of the plurality of groups of users, based on the one or more terms within the query;

send the query, the feedback data, and the response data to one or more members of the second group of users;

receive a second data entry from one of the one or more members of the second group of users;

provide second response data to the device, the second response data including the second data entry;

store the second data entry in the data repository;

determine second feedback data based on the second data entry;

determine one or more of the second set of coefficients based on the second feedback data; and determine one or more of the third set of coefficients based on the second feedback data.

9. The system of claim 7, wherein the one or more hardware processors further execute the processor-executable instructions to:

receive second feedback data from the device;

determine the second feedback data corresponds to a feedback threshold;

modify a first coefficient of the second set of coefficients without modifying a second coefficient of the second set of coefficients;

receive third feedback data from the device;
determine the third feedback data deviates from the feedback threshold; and
modify the second coefficient of the second set of coefficients without modifying the first coefficient of the second set of coefficients.

10. The system of claim 7, wherein the one or more hardware processors further execute the processor-executable instructions to:
determine one or more of the first set of coefficients using a training data set before receiving the query; and
determine one or more of the second set of coefficients in response to the feedback data.

11. The system of claim 7, wherein the first relevancy algorithm comprises one or more of: a term-based similarity algorithm, a semantic similarity-based dot product algorithm, or a synonym match-algorithm, and
wherein the first set of coefficients is determined using a training data set prior to receipt of the query, the training data set including training data augmented with a set of labels identifying semantic content within the training data.

12. The system of claim 7, wherein the one or more hardware processors further execute the processor-executable instructions to:
determine second feedback based on the data entry received from the one of the one or more members of the first group of users; and
determine the second set of coefficients based on the second feedback.

13. The system of claim 7, wherein the one or more hardware processors further execute the processor-executable instructions to:
determine the first group of users using an initial model of the group routing module;
receive a second query;
determine a count of previously received queries;
based on the count of the previously received queries being less than a second threshold value, transition to using a continuously trained model of the group routing module to determine the first group of users; or
based on the count of previously received queries being equal to or greater than the threshold value, transition to using a batch trained model of the group routing module to determine the first group of users.

14. The system of claim 13, wherein the one or more hardware processors further execute the processor-executable instructions to:
determine a count of feedback data exceeds a third threshold value; and
determine the third set of coefficients based on a set of feedback data.

15. A method comprising:
receiving a query at a first server from a user device;
retrieving a set of search results from a data repository in response to the query;
determining relevancy scores for the set of search results using a first relevancy algorithm and a second relevancy algorithm, the first relevancy algorithm including a first set of coefficients, the second relevancy algorithm including a second set of coefficients;
determining a first search result having a greatest relevancy score from the relevancy scores of the set of search results;
sending first response data including the first search result to the user device;
receiving first feedback data indicating that the first search result was not responsive to the query;
selecting, using a group routing module having a third set of coefficients, a first group of users, from a plurality of groups of users, based on a correspondence between words of the query and information about the first group of users, wherein the first group of users is associated with a confidence value that satisfies a confidence threshold, and wherein the confidence value indicates a likelihood that the first group of users is tasked with responding to queries related to the received query;
sending the query to one or more users of the first group of users;
receiving second response data from one of the one or more users;
sending the second response data to the user device;
storing the second response data in the data repository;
determining second feedback data based on the second response data and user feedback based on the first feedback data;
determining a first weight of the first feedback data and a second weight of the second feedback data, wherein the first weight is less than the second weight; and
determining the second set of coefficients based on the first feedback data and the second feedback data.

16. The method of claim 15, further comprising:
receiving third feedback data from the user device related to the second response data; and
determining one or more of the second set of coefficients in response to the third feedback data.

17. The method of claim 15, further comprising:
determining, using the first relevancy algorithm, first relevancy scores for one or more search results of the set of search results, the first relevancy algorithm to determine pairwise matches between words of the query and words within the set of search results using one or more of a term-based similarity algorithm, a semantic similarity-based dot product algorithm, or a synonym match algorithm, the first set of coefficients determined prior to use based on a set of training data;
determining, using the second relevancy algorithm, second relevancy scores for the one or more search results of the set of search results, the second relevancy algorithm to determine matches between the words of the query and lexical features associated with the set of search results; and
determining the relevancy scores for the set of search results by combining the first relevancy scores with the second relevancy scores.

18. The method of claim 15, further comprising:
receiving a second query from a second device;
retrieving a second set of search results from the data repository in response to the second query;
determining second relevancy scores for the second set of search results using the first relevancy algorithm and the second relevancy algorithm;
determining a second search result having a greatest relevancy score from the second relevancy scores of the second set of search results, the second search result including the second response data; and
sending third response data including the second search result to the second device.

19. The method of claim 15, further comprising:
constraining the second relevancy algorithm to produce output values that increase monotonically over time in response to the first feedback data and the second feedback data; and
constraining the second relevancy algorithm to limit a magnitude of the output values according to a predetermined limit value.

20. The method of claim 15, further comprising:
determining one or more of the third set of coefficients based on the second feedback data;
receiving a second query from a second device;
retrieving a second set of search results from the data repository in response to the second query;
determining relevancy scores for the second set of search results using the first relevancy algorithm and the second relevancy algorithm;
determining a second search result having a greatest relevancy score from the relevancy scores of the second set of search results;
determining the greatest relevancy score from the relevancy scores of the second set of search results is less than a threshold value;
determining, using the group routing module, a second group of users, from the plurality of groups of users, based on a correspondence between words of the second query and information about the second group of users; and
sending the second query to one or more users of the second group of users.

21. The method of claim 1, wherein the response data comprises an article written by the one of the one or more users of the first group of users in response to the query.

22. The method of claim 1, wherein the first group of users tasked with responding to queries related to the received query corresponds to one of: human resources employees of a human resources group of the organization, information technology employees of an information technology group of the organization, or accounting employees of an accounting group of the organization.

* * * * *